(12) United States Patent
Rageot et al.

(10) Patent No.: US 11,053,746 B2
(45) Date of Patent: Jul. 6, 2021

(54) PIPELINE INTEGRATED MANIFOLD

(71) Applicant: TECHNIP UK LTD, London (GB)

(72) Inventors: Olivier Rageot, London (GB); Peter Hayward, London (GB); Chrystalla Vorka, London (GB); Kevin De Klerk, London (GB); Graham Edwards, London (GB)

(73) Assignee: TECHNIP UK LTD

( * ) Notice: Subject to any disclaimer, the term of this patent is extended or adjusted under 35 U.S.C. 154(b) by 0 days.

(21) Appl. No.: 16/091,123

(22) PCT Filed: Mar. 31, 2017

(86) PCT No.: PCT/GB2017/050928
§ 371 (c)(1),
(2) Date: Oct. 4, 2018

(87) PCT Pub. No.: WO2017/174968
PCT Pub. Date: Oct. 12, 2017

(65) Prior Publication Data
US 2019/0120020 A1    Apr. 25, 2019

(30) Foreign Application Priority Data
Apr. 4, 2016 (GB) .................................. 1605738.2

(51) Int. Cl.
*E21B 17/02* (2006.01)
*E21B 43/017* (2006.01)
(Continued)

(52) U.S. Cl.
CPC .......... *E21B 17/02* (2013.01); *E21B 41/0007* (2013.01); *E21B 43/017* (2013.01);
(Continued)

(58) Field of Classification Search
CPC .. E21B 41/0007; E21B 43/017; E21B 17/015; E21B 43/0107; E21B 43/013; E21B 17/02; F16L 1/16; F17D 3/01; F17D 5/00
See application file for complete search history.

(56) References Cited

U.S. PATENT DOCUMENTS 4,019,334 A    4/1977 Sinclair et al. .................. 61/110
6,148,921 A *  11/2000 Valla .................... E21B 43/0107
                                                        166/344
(Continued)

FOREIGN PATENT DOCUMENTS

CN    203703360 U    7/2014
CN    204213471 U    3/2015
(Continued)

OTHER PUBLICATIONS

International Search Report dated Jun. 22, 2017 in corresponding PCT International Application No. PCT/GB2017/050928.
(Continued)

*Primary Examiner* — Atif H Chaudry
(74) *Attorney, Agent, or Firm* — Ostrolenk Faber LLP

(57) ABSTRACT

A subsea manifold (150) is integrated into a pipeline (22) so as to be deployable to the seabed together with the pipeline, from a pipe-laying vessel. The subsea manifold comprises a hub (106a, 106b) for receiving production fluid from at least one subsea christmas tree (54a, 54b), and further comprises a connection (112) for at least one service line (116) connected to a surface supply or control or monitoring facility.

30 Claims, 19 Drawing Sheets

(51) Int. Cl.
*E21B 41/00* (2006.01)
*F16L 1/16* (2006.01)
*F17D 3/01* (2006.01)
*F17D 5/00* (2006.01)

(52) U.S. Cl.
CPC ............... *F16L 1/16* (2013.01); *F17D 3/01* (2013.01); *F17D 5/00* (2013.01)

(56) References Cited

U.S. PATENT DOCUMENTS

| | | | | |
|---|---|---|---|---|
| 6,213,215 | B1* | 4/2001 | Breivik | E21B 7/128 166/350 |
| 6,435,771 | B1 | 8/2002 | Baugh | 405/158 |
| 6,497,286 | B1* | 12/2002 | Hopper | E21B 23/08 166/368 |
| 6,733,208 | B2 | 5/2004 | Stockstill | 405/169 |
| 2002/0159839 | A1 | 10/2002 | Frijns et al. | 405/166 |
| 2003/0147699 | A1 | 8/2003 | Long et al. | 405/158 |
| 2004/0144543 | A1* | 7/2004 | Appleford | E21B 43/36 166/336 |
| 2010/0085064 | A1 | 4/2010 | Loeb et al. | 324/537 |
| 2011/0243689 | A1 | 10/2011 | Pose | 414/137.1 |
| 2012/0138306 | A1 | 6/2012 | Berg | 166/349 |
| 2012/0138307 | A1* | 6/2012 | Berg | E21B 43/017 166/349 |
| 2013/0277060 | A1 | 10/2013 | Critsinelis et al. | 166/345 |
| 2014/0112803 | A1* | 4/2014 | Hallset | E21B 43/20 417/53 |
| 2014/0193205 | A1* | 7/2014 | Parsinejad | E21B 43/0107 405/169 |
| 2015/0136409 | A1* | 5/2015 | Hall | E21B 33/0355 166/344 |
| 2015/0345274 | A1 | 12/2015 | Sathananthan et al. | |
| 2016/0025240 | A1 | 1/2016 | Du | |
| 2018/0258742 | A1* | 9/2018 | Sveberg | E21B 43/017 |

FOREIGN PATENT DOCUMENTS

| | | |
|---|---|---|
| EP | 0 336 492 A1 | 10/1989 |
| EP | 1696163 A1 | 8/2006 |
| GB | 2191229 A | 3/1986 |
| GB | 2347183 A | 8/2000 |
| GB | 2478548 A | 9/2011 |
| GB | 2487578 A | 8/2012 |
| GB | 2509165 A | 6/2014 |
| GB | 2515506 A | 12/2014 |
| WO | WO 99/54197 | 10/1999 |
| WO | WO 2006/054891 A1 | 5/2006 |
| WO | WO 2006/085739 A1 | 8/2006 |
| WO | WO 2006/089786 A1 | 8/2006 |
| WO | WO 2007/108673 A1 | 9/2007 |
| WO | WO 2008/096107 A2 | 8/2008 |
| WO | WO 2009/022175 A1 | 2/2009 |
| WO | WO 2009/148301 A2 | 12/2009 |
| WO | WO 2011/098828 A1 | 8/2011 |
| WO | WO 2012/091556 A1 | 7/2012 |
| WO | WO 2015/167328 A1 | 11/2015 |
| WO | WO 2016/044910 A1 | 3/2016 |

OTHER PUBLICATIONS

Written Opinion dated Jun. 22, 2017 in corresponding PCT International Application No. PCT/GB2017/050928.
Grayloc Products an Oceaneering International Company. "Installation and Maintenance of the Grayloc Connector" Copyright 2004 by Grayloc Products. Web address: http://www.oceaneering.com/wp-content/uploads/2009/08/Grayloc-Installation-and-Maintenance-Bulletin-Rev.-K.pdf.

* cited by examiner

PIPELINE INTEGRATED MANIFOLD

CROSS-REFERENCE TO RELATED APPLICATIONS

The present application is a 35 U.S.C. §§ 371 national phase conversion of PCT/GB2017/050928, filed Mar. 31, 2017, which claims priority to United Kingdom Patent Application No. 1605738.2, filed Apr. 4, 2016, the contents of which are incorporated herein by reference. The PCT International Application was published in the English language.

BACKGROUND OF THE INVENTION

The present invention concerns a pipeline integrated manifold which can be used to simplify subsea production equipment (which includes equipment for hydrocarbon production, gas and/or water injection with or without additives), simplify subsea production equipment layouts and simplify subsea equipment installation methods.

DESCRIPTION OF THE RELATED ART

A subsea manifold is an arrangement of piping and valves that connects between subsea christmas trees and flowlines and is designed to combine, distribute, control and monitor fluid flow. It is used to optimise the subsea layout arrangement and reduce the quantity of risers connected to the topside production facility. A manifold is typically composed of pipework and valves, structure framework, subsea connection equipment, foundation and controls equipment. (Subsea control modules (SCMs) may either be internal or external to the manifold). A subsea manifold typically includes many or all of the following functions and capabilities:

It commingles and directs produced fluids from multiple wells into one or more flowlines;
Connection slots/hubs/flanges for subsea tree spools and umbilical connections by means of diver assisted/diverless tie-in systems (a spool being a rigid/flexible pipe with connectors at either end used to connect flowlines and/or subsea facilities together);
Distribution of control, instrumentation, chemical injection and gas lift lines from a main umbilical to the trees;
Provision of instrumentation for process monitoring;
Provision of support for the contained pipework, valves and equipment;
Provision of protection for the contained equipment from dropped objects;
Pigging capability, optionally with provision of a pig launcher/receiver;
Provision of pig detection instrumentation.

The term "manifold" is also used in the art with its more general meaning of a pipe fitting or similar device that connects multiple inputs or outputs. Thus when used in this sense (see e.g. WO 2006/089786) an in-line manifold is similar to an in-line tee, meaning a mid-line structure, integral to a pipeline, providing a branched section normally with at least one, or possibly two or more valves (e.g. one in the main line and another on the or each branch) and at least one hub or flange connector (typically one per branch) for rigid or flexible spool connection to another subsea structure. For brevity, such branched structures (whether with one or more branches) integrated into a pipeline are referred to collectively in the following as "in-line tees". A flange connector provides a bolted connection between conduit sections, requiring diver intervention. A hub connector is a diverless pipeline, spool or umbilical connection device where the mechanical clamping force is provided by collet type or hinged element clamp type connection to overcome joint separation and maintain a pressure tight seal. A pipeline is a tubular conduit or system of pipes, used to transport fluid to or from the well, e.g. product to a facility for storage, processing, refining or transfer for sale, often over great distances; or for conveying water, gas or other fluids to the well for injection. For the purposes of this specification, the term flowline can be used interchangeably with the term pipeline. In-line tees are normally welded into a pipeline, typically aboard the pipe laying vessel, so as to be deployed to the sea bed as an integral part of the pipeline.

Pipeline Installation Methods

There are three common methods in which subsea pipe is laid, and they are S-Lay, J-Lay and Reel-Lay. The capabilities of the lay vessel (e.g. tension capacity, dynamic positioning ability, etc.) are integral to the success of the installation.

S-Lay Installation Method

S-lay refers to the "S" shape that the pipe 22 forms during laying to the seabed (the S curve between the pipe on the vessel and the touchdown point on the seabed). On an S-lay vessel, the pipe joints are welded to the assembled pipe one by one (offshore welding), inspected and coated. This work is carried out in the firing line (work stations for fabrication of the pipe and deploying it from the vessel). In an S-lay vessel, the firing line lies in a substantially horizontal plane. As welding, inspection and coating progresses, the vessel moves forward and the pipe leaves the vessel 10 at the stern through a sloping ramp (stinger) 12 and is lowered towards the seabed 14, as shown in FIG. 1.

The main installation equipment used during S-lay installation are tensioners 16 and the stinger 12. The tensioners 16 are located near the stern and their purpose is to control the curvature in the sagbend (the bend 18 where the lower section of the pipe meets the seabed 14) during laying down. As the length and weight of the pipe being laid increase with water depth, the required tension also increases and therefore the tension capacity of the tensioners 16 sets a limitation to how deep the vessel can install. The stinger 12 is a steel frame structure with rollers which protrudes from the end of the firing line and supports the pipeline during installation to control the curvature in the overbend area 20 (the overbend being the bend in the pipe between the firing line and the suspended portion 22 of pipeline leading to the sea bed 14). S-lay installation methods, vessels and associated pipe fabrication and installation equipment therefore tend to be used at shallower water depths, not much beyond 500 m; and for larger diameter pipelines, typically greater than 15 inches (381 mm), e.g. 30 inch (762 mm) and even 40 inch (1016 mm). As such, S-lay installation methods are not of primary interest in the context of the present invention, as will become more apparent from the discussion below.

J-Lay Installation Method

J-lay refers to the "J" shape that the pipe forms during laying to the seabed. A length of pipeline 26 (up to six 12 m sections with a total length of 72 m which are welded offshore on board the vessel), FIG. 2, is lifted via a tall tower 24 on the vessel 10, welded to the seagoing pipe 22 at a welding station 28 and leaves the vessel from almost a vertical position (the pipe takes a "J" shape on the way down to the touchdown point on the seabed 14). The top of the last welded length of pipe 26 is clamped in a movably guided head clamp which is used to lower the pipe down as the J-lay vessel moves forward. A hangoff module (HOM) below the welding station is used to support the pipe catenary between the vessel and the sea bed. The HOM is a clamp which holds and positions the end of the seagoing pipeline in place for welding on the next length of pipeline or other structures as further discussed below. Due to the near vertical position of the pipe leaving the vessel and the fact that the pipeline is only bent near the seabed (sagbend curvature 18), the J-lay installation method puts less stress on the pipeline and therefore allows it to work in deeper water depths. In addition, pipeline installed with the J-lay method can withstand more motion and current loading in comparison to S-lay installations. Compared to the S-lay method, the J-lay method:

has a lower production rate since it does not allow more than one welding station;
is less suited for shallow waters.

Reel-Lay Installation Method

Reel-lay is used to install small diameter pipelines (typically up to 20 inches, 508 mm) and flexible pipe. The pipeline is either reeled from a spool base (onshore facility) onto a large drum 30, FIG. 3, on the vessel 10, or the pipe is reeled onto the drum onshore and the filled drum is lifted from the dock to the vessel. The pipe 22 is then simply rolled out and deployed to the seabed 14 via a ramp 32 as the installation is performed. Tensioners installed on the ramp hold and support the pipe and control curvature at the seabed. The drum 30 may be vertical as shown in FIG. 3, or it may be horizontal. When the pipe on the reel has all been installed, the reel-lay vessel will need to return to the spool base or lift a new reel from a transport vessel (depending on the vessel crane capability). The reel-lay vessel ramp angle is adapted depending on water depth to achieve the right catenary (similar to J-lay in deep water, closer to S-lay in shallow water). Reel-lay vessels are characterised by a good pipe-laying speed and reduced installation costs due to the fact that the welding, NDT and coating of the pipe sections is performed onshore.

FLET and ILT Installation

Flowline/pipeline end terminations (FLETs/PLETs) are positioned at the beginning and end of a flowline or pipeline while in-line tees (ILTs) can be found anywhere along a pipeline/flowline. FLETs/PLETs are integrally welded to the flowline/pipeline and typically have at least one valve and a hub for rigid or flexible spool connection to another subsea structure. All of these structures are loaded onto the vessel's deck and, in the case of J-lay vessels, are upended by deck mounted cranes into vertical or near vertical positions for welding into the pipeline at the appropriate positions. FLETs/PLETs 34 are upended on the vessel deck (FIG. 4*a*) and usually positioned onto the PLET handling device (PHD) 36. The PHD 36 straddles the moon pool 38 (permanent opening in the middle of the deck to facilitate in-line structure installations). The HOM 40 (FIG. 4*b*) is positioned below the PHD within the moonpool opening. Alternatively the PHD 36 and HOM 40 may be positioned adjacent/overhanging a side of the vessel, e.g. the stern.

The first FLET is welded onto the first length of flowline while positioned in the PHD before being lowered through the moon pool on the end of the flowline which is fabricated length by length and deployed towards the sea bed in the usual way. Flowline installations require an initiation point to keep the tension in the line while the vessel lays the pipe. This initiation point is usually a suction pile 42 (FIG. 4*c*), a skirted mudmat foundation or a clump weight. The first FLET 34 is lowered towards the seabed on the end of the flowline 22. A hook structure on the first FLET 34 is attached to the suction pile 42 with the aid of a cable/chain 33 for the start of the flowline installation. The pipe laying vessel can then move away from the suction pile 42, maintaining tension in the flowline 22 so that first the cable 33, then the first FLET 34 and then the flowline 22 are laid out along the seabed 14, as further flowline is deployed.

The final FLET is positioned in the PHD and welded to the end of the seagoing flowline which is supported in the HOM. The final FLET is provided with a hook structure by which it can be suspended from the pipe laying tower on a supporting chain or cable and lowered to the seabed together with the catenary pipe as the latter is laid out along the seabed.

ILTs are also welded into the flowline while positioned above the moon pool and HOM. The ILT 34 is loaded into the J-lay ramp by attaching a pipe 44 extending from the ILT structure (FIG. 4*d*) to the movably guided head clamp in the tower. The ILT can then be lifted into position by the head clamp, for welding the ILT into the flowline and lowering it through the moon pool. A further length of pipe 26 is welded to the extended pipe and the head clamp and HOM can then be used to lower the pipeline and incorporated ILT in the usual way.

FLETs and ILTs are also capable of being installed with S-Lay and reel-lay vessels and methods. However in all cases there are size and weight constraints for structures which are installed integrally with the flowline (PHD capacity and moon pool size for J-lay method and stinger/ramp width for S-lay/reel-lay methods). In all cases, buoyancy modules are attached to the structures to counteract their submerged weight and to control the tension in the flowline.

Prior Art Subsea Manifold and Tree Service Connection Layouts

A simplified field schematic for a subsea manifold 50 with tree mounted SCMs 52 is shown in FIG. 5. In this arrangement, the subsea manifold 50 connects the subsea trees 54 to the flowline 22 via a spool 56 connected to a FLET 58. An umbilical termination assembly (UTA) 60 is connected to a subsea distribution unit (SDU) 62 via flying leads (FLs) 70. The various services provided through the umbilical 48 are then distributed from the SDU to the subsea trees 54 (via hydraulic flying leads (HFLs) 64) and usually directly to the tree mounted SCMs 52 (via electrical/optical FLs 66). Controls and chemical supplies to the offline manifold are provided via multi-bore spools 68 which connect the subsea trees 54 to the manifold 50, or via FLs (in the case of mono-bore spools being used) from the subsea trees 54 and tree mounted SCMs 52 to the manifold 50. A UTA is an assembly used to terminate an umbilical (in this case umbilical 48) and provide output connection points for hydraulic, chemical, electrical and fibre optic services. Electrical and optical connectors are typically individual ROV bulkhead type connections, with hydraulic and chemical connections either individual (for diver hook-up) or multi-quick connector (MQC) stab plates (for diver or ROV hook-up). Connections between UTA outputs and associated structures are made by separately installed flying leads. A UTA is installed onto a foundation structure 72 which can be an integral mudmat, a dedicated location on a mudmat shared with an associated structure (typically a subsea distribution unit, in this case SDU 62) or a dedicated location directly onto an associated structure such as a drill centre manifold. An SDU is an assembly used to distribute hydraulic, chemical and electrical supplies and signals from the UTA to the subsea facilities (subsea trees and manifolds) via flying leads.

The FLET 58 is connected to a further FLET 80 by a rigid spool 82 forming part of the flowline 22. The FLETs 58, 80 are installed integrally with the flowline 22 using a pipe-lay vessel. The distance and angle between connectors on the FLETs (metrology) is measured in order for the connecting spool 82 to be manufactured in a fabrication yard on land and transported to the field so that it may be installed. The manufacturing and installation process for the spool 56 between the subsea manifold 50 and the FLET 58 is similar unless a flexible spool is used. A suction pile (generally used as the manifold 50 foundation) is lifted and installed in position. An intermediate structure may be integrated with or installed over the foundation, to receive the main manifold module, in particular to accommodate jumper parking and manifold levelling requirements. Thereafter, the manifold 50 is installed, before the subsea tree spools 68 can be measured, fabricated and installed. Thus this field architecture comprises:

FLETs 58, 80 for flowline termination/continuation and connection to the offline manifold;
Rigid spool 82 connecting FLET 80 to FLET 58;
Rigid/flexible spool 56 connecting FLET 58 to the subsea manifold 50;
Stand-alone subsea manifold 50 with separate foundation (usually a suction pile) and any intermediate structure;
UTA 60 with umbilical distribution including control system supply/return lines and chemical supplies. Control system distribution comprises electrical power/signal lines and hydraulic power lines;
SDU 62 for chemical and control system distribution to the subsea trees 54 and tree mounted SCMs 52;
Support structure for the UTA 60 and SDU 62;
FLs 70 to connect the UTA to the SDU;
FLs 64, 66 to connect the SDU 62 to the subsea trees 54 and tree mounted SCMs 52;
Flying lead deployment frame;
Multi-bore spools 68 from the subsea trees to the manifold 50 or mono-bore spools with or without piggy-backed FLs.

FLET 58 and associated flowline is installed in a first pipe laying operation. Further FLET 80 and associated flowline must be installed in a second and separate pipe laying operation. Any (first end) FLET used to initiate the pipe laying operation will require a (separately) pre-installed foundation. The manifold 50, its foundation, any intermediate structure, the UTA 60, its foundation and the SDU 62 all require separate installation operations. The spools 56, 68 and 82 must likewise be separately measured, fabricated and installed. The numerous FLs must also be installed. The complete installation operation is therefore complex and time consuming.

The field architecture shown in FIG. 5 is improved upon in the arrangement shown in FIG. 6, in the following way:
The FLET 58 and further FLET 80 are replaced with an ILT 84;
The umbilical 48 is terminated at and the subsea service distribution is performed at the subsea manifold 50.

Installation contractors cannot always guarantee that an in-line tee (ILT) structure will be installed vertically because the anticipated pipeline rotation during installation cannot be predicted accurately. For this reason, many operators consider ILT installation to be of high risk due to the possibility of increased tie-in operation time because of ILT structures being installed with misalignments greater than acceptable limits. Recent detailed investigation of pipe rotation and improved installation techniques can provide rotation control which can keep the ILT 84's alignment within acceptable installation tolerances during pipe-lay. Terminating the umbilical 48 at the manifold 50 eliminates the need for a separate support structure for the UTA 60 and SDU 62 as this equipment will be accommodated within the manifold 50's structure. From the manifold SDU 62, EFLs will then connect to the tree mounted SCMs 52, while hydraulic and chemical services will be distributed from the manifold mounted SDU 62 to the subsea trees 54.

The FIG. 6 field architecture thus comprises:
An ILT 84 installed integrally with the flowline 22 as a single pipe laying operation;
A rigid/flexible spool 56 connecting the ILT 84 to the subsea manifold 50;
Stand-alone offline manifold 50 with separate foundation (usually a suction pile) and any required intermediate structure;
Equipment in offline manifold 50:
UTA 60 with umbilical distribution including control system supply/return lines, electrical power/signal lines and chemical supplies. Control system distribution comprises electrical power/signal lines and hydraulic power lines;
SDU 62 for chemical and control system distribution to the subsea trees and tree mounted SCMs.
FLs 64, 66 to connect the SDU to the subsea trees and tree mounted SCMs;
Flying lead deployment frame;
Multi-bore spools 68 from the subsea trees 54 to the manifold 50 or mono-bore spools with or without piggy-backed FLs.

The field architecture shown in FIG. 6 has the following benefits over that shown in FIG. 5:
Fabrication savings:
FLETs 58, 80 replaced by ILT 84;
Fewer spools required to connect the flowline to the manifold;
Separate support structure for UTA 60 and SDU 62 not required.
Equipment savings:
Fewer connectors required;
Fewer large bore valves required;
Installation savings:
Metrology and installation of rigid spool 82 is not required;
Initiation pile relocation for installing the further FLET 80 is not required;
Installation of the further FLET 80 is not required (both FLETs having been replaced by the ILT 84);
Installation of support structure for UTA 60 and SDU 62 is not required. Note that the improvements shown in FIG. 6 associated with the flowline (FLET replacement by ILT) on the one hand and associated with the umbilical on the other hand (no separate support structure) can also be implemented separately, i.e. an ILT can be used with separate support structure for the UTA and SDU, rather than integrating these components into the subsea manifold 50; or the UTA and SDU can be integral to the manifold 50, but the FLET 58, further FLET 80 and spool 82 are still used, rather than being replaced by the ILT 84.

Subsea manifolds serving subsea christmas trees, e.g. to provide production flow control and commingling, production flow monitoring, chemical injection, and gas lift services to a cluster of subsea wells, as well as the associated foundations and overtrawl/dropped object protection structures for such a manifold, are large and heavy assemblies. Conservative life-of-field design approaches and a lack of knowledge of or trust in the long-term reliability of the various components making up such subsea manifolds has led to such subsea manifolds being designed as stand-alone structures, installed separately from the flowline/pipeline, and retrievable as a unit, if need be. The present applicants have realised that a less conservative and more deeply integrated engineering design approach for subsea manifolds is feasible, which can lead to still further savings in fabrication, equipment and installation requirements.

SUMMARY OF THE INVENTION

The present invention provides a subsea manifold as defined in claim 1. The present invention correspondingly provides a method of installing a subsea manifold as defined in claim 32. The subsea manifold may thus be welded or otherwise connected (e.g. using flanges) into the flowline aboard a pipe laying vessel for deployment to the seabed, in the same way as an in-line tee, or a FLET/PLET, but includes additional functionality as normally found in a subsea manifold, provided via the connection and service line(s). The subsea manifold may additionally include one or more production fluid flow control or isolation valves (as sometimes found in an ILT) and one or more connections for one or more electrical, optical or hydraulic lines used to operate the valve(s). Thus the service line connection mentioned above may comprise or be additional to any connections for the lines used to operate the valve(s). The subsea manifold may comprise a subsea control module (SCM).

Thus for the first time, a structure which is installed with the flowline can incorporate the functionality of a subsea manifold used to control and service a group of subsea wells. This new way of installing a subsea manifold eliminates the requirement for connecting structures and spools between an offline manifold (i.e. a manifold which is installed separately from the flowline) and the flowline.

The complete PLIM may not be easily retrievable, but provision may be made for certain critical components to be retrieved independently (e.g. the SCM or MPFM, or other parts having a limited service life, such as other sensors and valves). The PLIM may comprise a base module which remains permanently connected to the flowline in use, and one or more retrievable modules containing the serviceable/replaceable components. The base and retrievable modules are provided with releasable mechanical fastenings and wet mate service line connectors, allowing the retrievable modules to be releasably connected to the base module, e.g. by ROV or with diver assistance. In this case the complete PLIM may be initially installed together with the pipeline using a conventional pipe laying vessel. Alternatively, e.g. for sequential (phased) field development only the PLIM base module may be initially installed at the seabed, so as to maintain continuity of the flowline of which it forms a part. The complementary PLIM module(s) is/are installed on the base module at the seabed, to provide XT connectivity for the wells, including the full PLIM functionality as dictated by the service requirements of the particular installation. This may be performed by a different vessel and during a separate campaign. The retrievable module may also be recovered and replaced by a different module to adapt to evolving requirements during the field life. For example, an initially installed retrievable module may be replaced by a new module incorporating different or additional equipment/functionalities, such as subsea boosting or subsea processing equipment.

The traditional division of a field development contract into discrete disciplines, as defined by the customer (subsea oil and gas production operators) restricts collaboration between individual discipline contractors to the exchange of necessary and very specific interface information. The present invention may be viewed as resulting from deeper integration between subsea production system (SPS) and subsea umbilical, risers and flowline (SURF—including installations) engineering and deployment disciplines. Manifolds are normally installed separately from the flowline installation because of the structure size and weight and the complexity of the equipment within the manifold and a perceived need for retrievability as part of the life-of-field servicing requirements. These installations are performed with multiple subsea lifts and may require a specific installation vessel. Conventional manifolds can be retrieved for maintenance purposes or for the replacement of specific items. This drives the conventional architectures of subsea manifolds on a stand-alone foundation and connecting spools to separate pipelines. A subsea manifold according to the invention which is integrated into the pipeline (PLIM) and therefore which can be deployed from existing pipe laying vessels as a normal, uninterrupted part of a pipe laying operation, represents a new and inventive departure from these conventional field architectures.

The at least one service line may comprise an external signal line. The connection may for example interconnect one or more external signal lines with one or more sensors or instrumentation on or in the subsea manifold, for example a temperature sensor, a pressure sensor, a sand or erosion detector, a viscosity sensor, a pH meter, a pig detector, a position sensor (e.g. for an actuator), a flow meter (including a multiphase flowmeter, MPFM), or any other suitable instrumentation or sensors or combinations thereof, as desired.

Additionally or alternatively, the connection may interconnect, e.g. internally of the subsea manifold, with at least one further connection for an associated further service line. The or each further service line may be connected to other subsea equipment, for example a subsea christmas tree or subsea production fluid processing equipment. The subsea manifold thereby serves to distribute the service provided via the service line and its connection, to the other subsea equipment, via the further connection(s) and further service lines.

The connection may comprise a mono-bore hub connector or a multi-bore hub connector. A multibore additional connection facilitates integration and may minimise impact on the overall dimensions of the PLIM structure. The service line may comprise an umbilical, i.e. a cable or conduit or bundle of cables and/or conduits that connects a topside facility to a subsea development and e.g. provides hydraulic and/or electrical power for motors and actuators for mechanical devices such as valves and pumps; chemical injection and gas lift for flow assurance; and electrical, hydraulic and optical signals (data) to and from the other subsea equipment for motor and actuator control and monitoring and sensor data acquisition and monitoring. The connection thus may comprise an umbilical termination assembly (UTA), i.e. an assembly used to terminate the umbilical and provide output connection points for hydraulic, chemical, electrical and fibre optic services. Electrical and optical connectors in this case are typically individual ROV bulkhead type connections, with hydraulic and chemical connections either individual (for diver hook-up) or multi-quick connector (MQC) stab plates (for diver or ROV hook-up). Connections between UTA outputs and the other subsea equipment are made by separately installed flying leads. The connection alternatively may comprise an umbilical termination head (UTH), i.e. an assembly used to terminate the umbilical and which connects to the subsea manifold directly via an MQC plate or hub type multi-bore connector for direct hydraulic/chemical hook-up without intermediate flying leads. Electrical and optical connections can be via individual ROV bulkhead type connections with separate flying leads to the other subsea equipment, or connection to the other equipment via integral "pig-tail" flying harnesses stowed on the UTH assembly within baskets or on figure-eight bosses during umbilical installation. The subsea manifold may comprise a further UTA or UTH, for connection of a further umbilical. The further umbilical may for example supply or provide additional services to the subsea manifold. Alternatively, the UTA/UTH and further UTA/UTH may be series-connected, to allow the umbilical and further umbilical to be daisy chained.

The at least one further connection (where present) may comprise a subsea distribution unit (SDU), i.e. an assembly used to distribute hydraulic, chemical and electrical supplies and signals between the subsea manifold and the other subsea equipment via flying leads. These flying leads may be for example piggy-backed on spools connecting tree production flow to the subsea manifold.

Additionally or alternatively the at least one further connection (where present) may be connected to an associated multi-bore spool arranged to convey production fluid and one or more service fluids between the subsea manifold and a subsea tree. The further connection thus may comprise a multi-bore hub connector. The service fluid may comprise for example injection water and/or a chemical injection fluid; or gas for gas lift purposes.

The service provided via the subsea manifold's connection may therefore comprise hydraulic power or electric power, for distribution to other subsea equipment, for example a subsea christmas tree or subsea production fluid processing equipment. The service provided via the subsea manifold's connection may comprise hydraulic, electrical or optical data signals, whether for control of equipment integral to or external to the subsea manifold or for monitoring the condition of such integral or external equipment, or for monitoring equipment, process or environmental conditions in such integral or external equipment. The service provided via the subsea manifold's connection may comprise service fluids such as water for injection, chemical injection fluid, or lift gas, for use in a well to which the subsea manifold is connected. The manifold may comprise a plurality of such connections, providing a plurality of such services, which may be the same or different to one another, in any suitable number or combination. The manifold may comprise subsea boosting or subsea processing equipment.

BRIEF DESCRIPTION OF THE DRAWINGS

The invention and preferred features and advantages thereof may be further understood from the following description made with reference to the accompanying non-limiting, illustrative drawings. Like reference numbers are used to denote similar features throughout the various views. To partially recap and expand upon the foregoing, in the drawings.

DETAILED DESCRIPTION OF THE
ILLUSTRATIVE EMBODIMENTS

Figure 1:
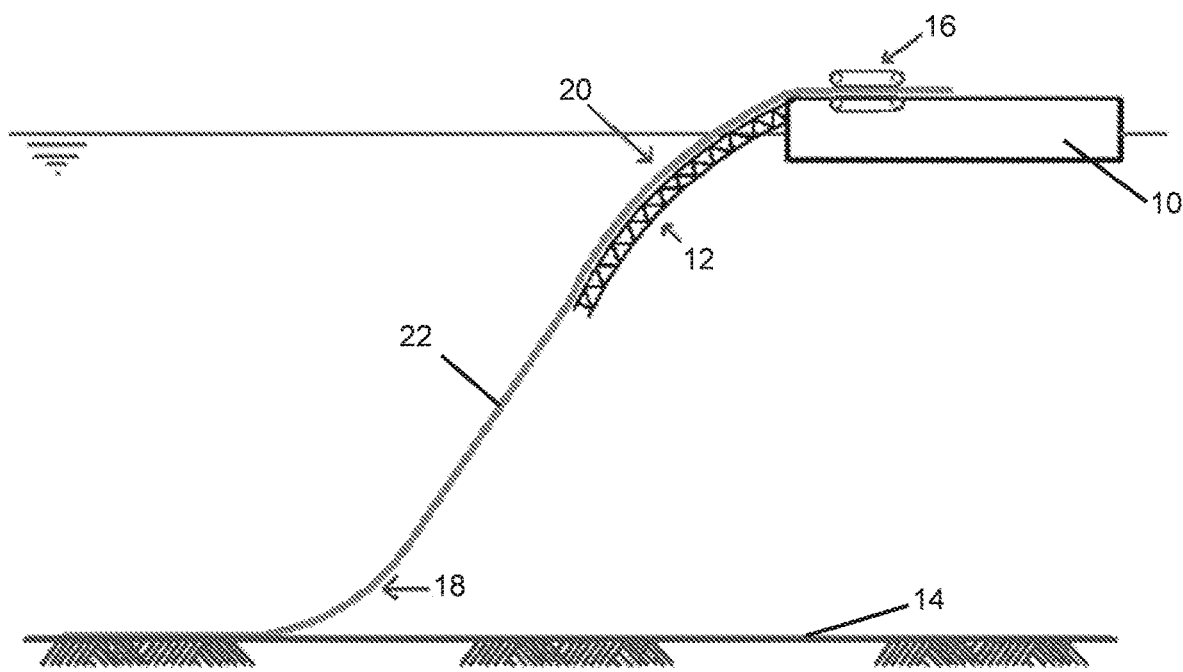
FIG. 1 shows a subsea pipeline being laid using a prior art S-lay method.
Figure 2:
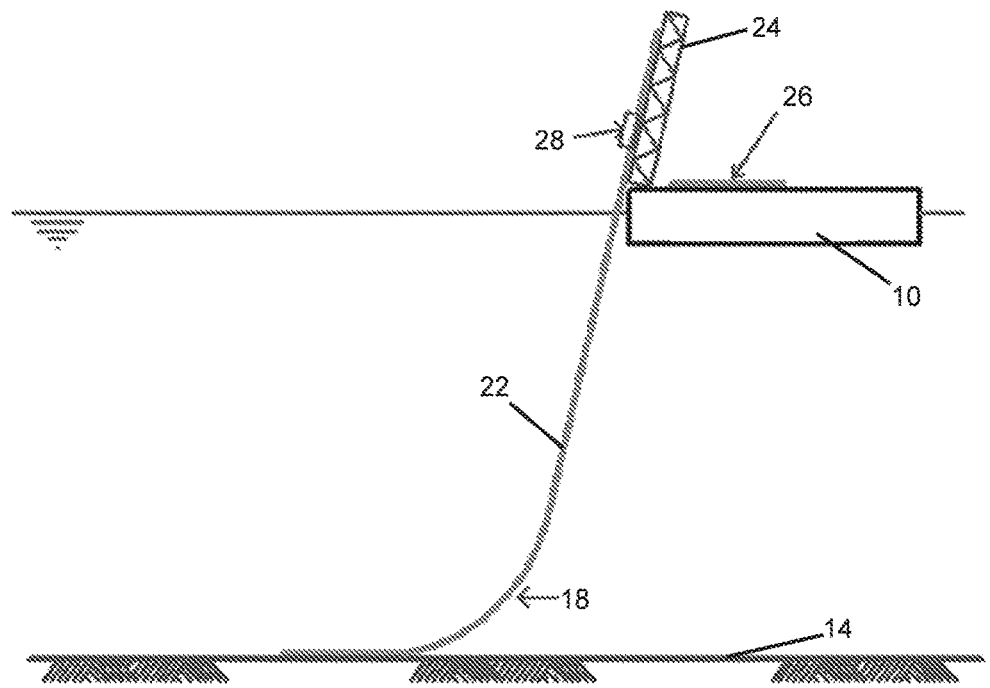
FIG. 2 shows a subsea pipeline being laid using a prior art J-lay method.
Figure 3:
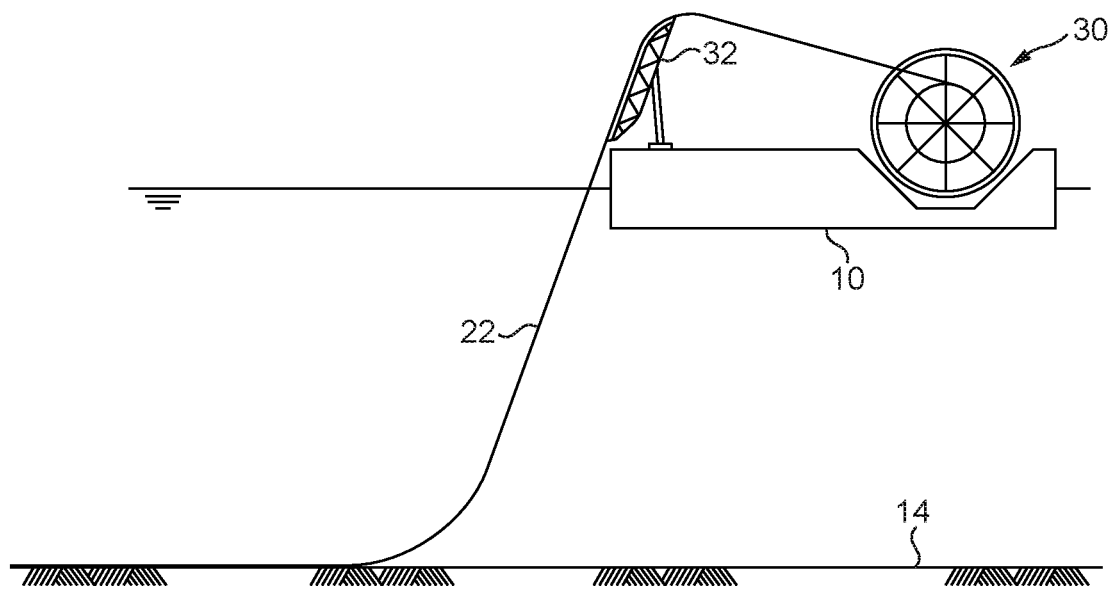
FIG. 3 shows a subsea pipeline being laid using a prior art reel-lay method.
Figure 4A:
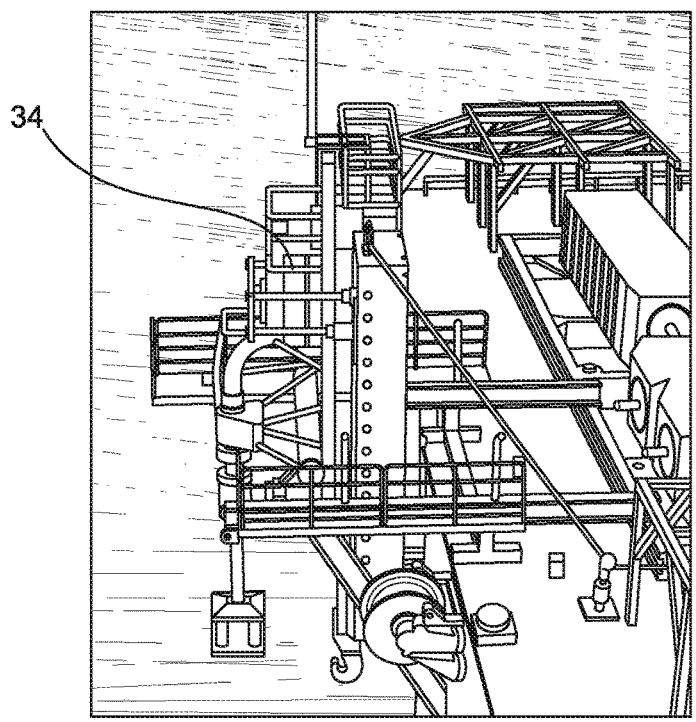
FIGS. 4a-4c respectively show a prior art PLET being upended, positioned above a HOM and moonpool and installed subsea using a pile foundation for initiation.
Figure 4B:
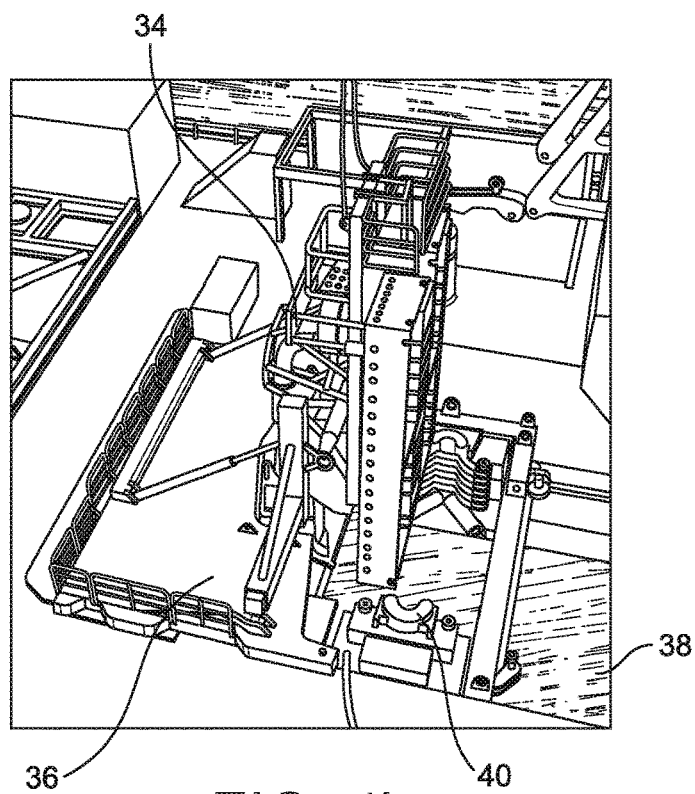
Figure 4C:
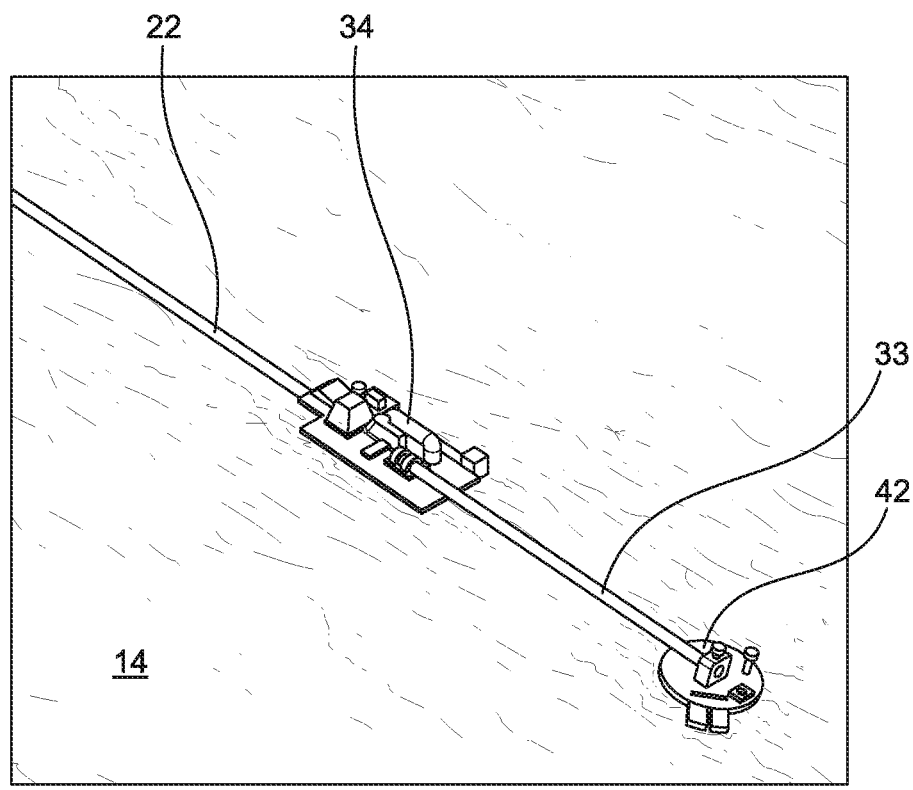
Figure 4D:
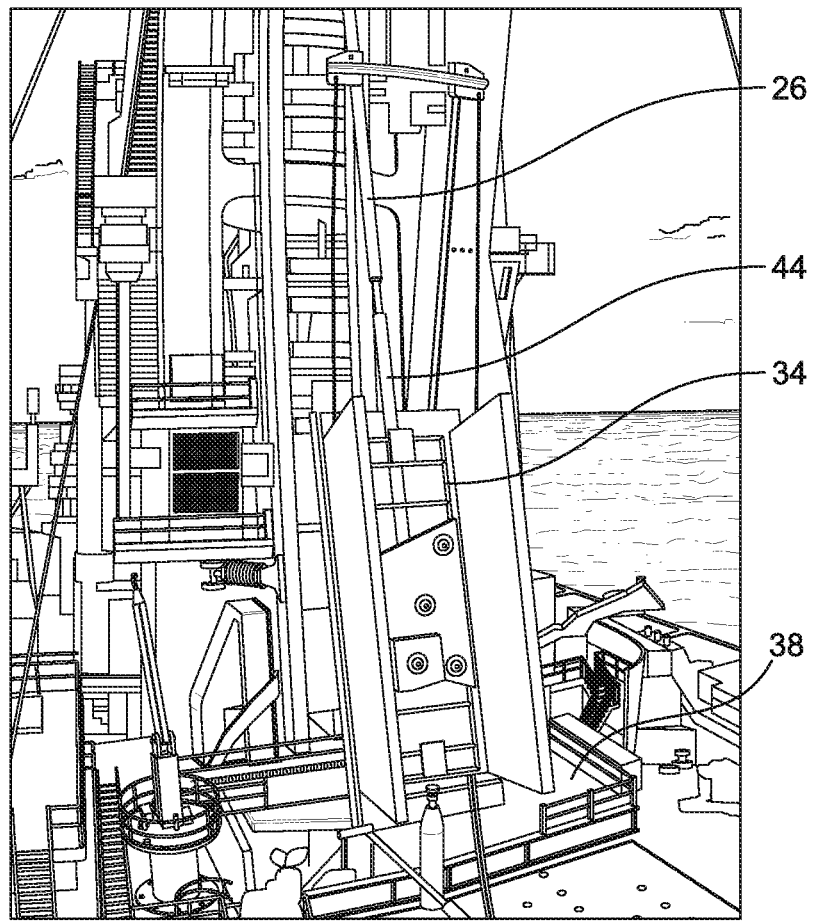
FIG. 4d shows a prior art ILT positioned in a J-lay firing line on a pipe laying vessel.
Figure 5:
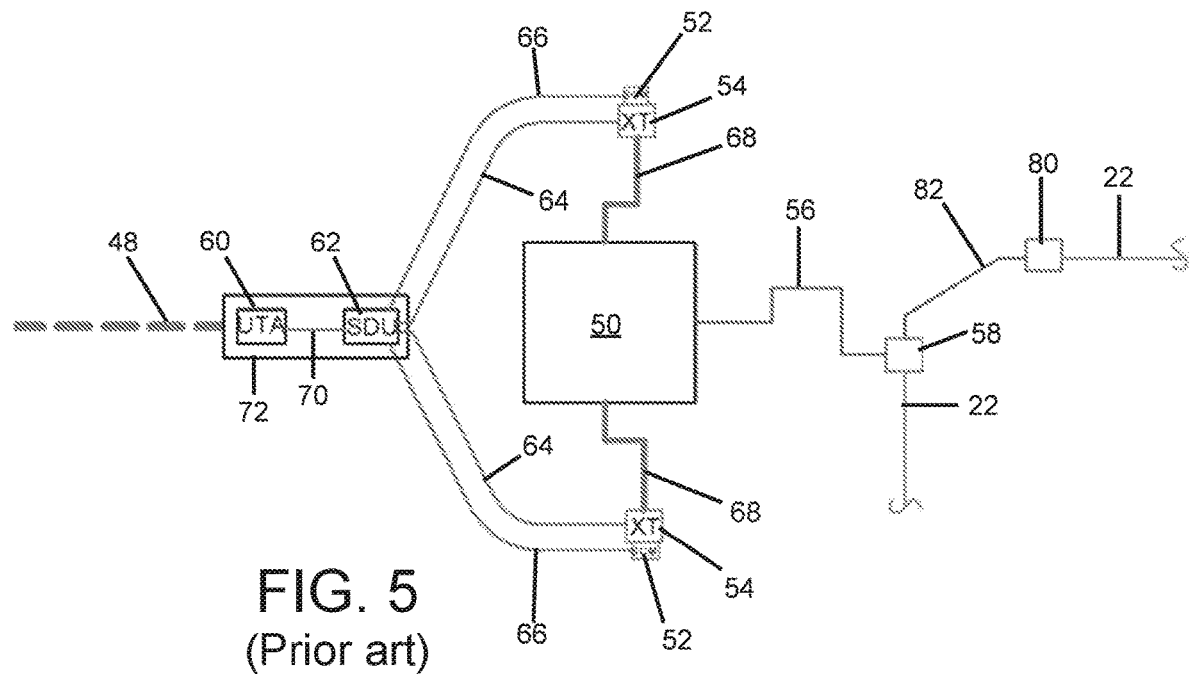
FIG. 5 shows a first prior art field layout comprising a stand-alone subsea manifold.
Figure 6:
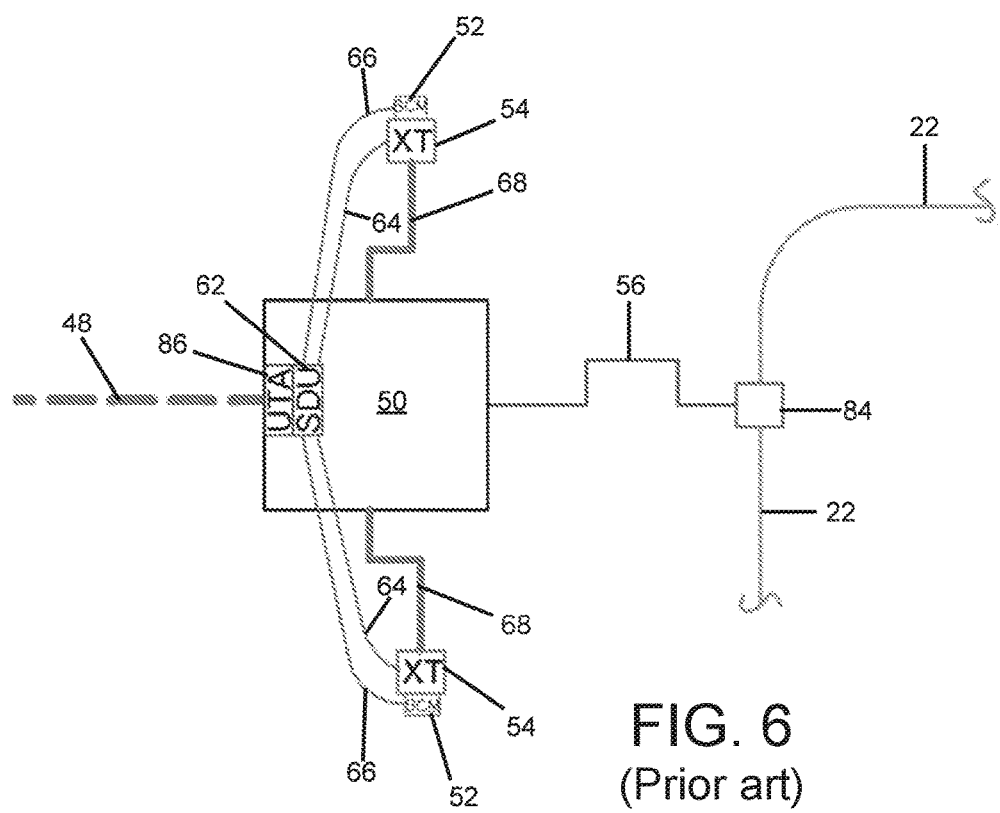
FIG. 6 shows a second prior art field layout comprising a stand-alone subsea manifold.
Figure 7:
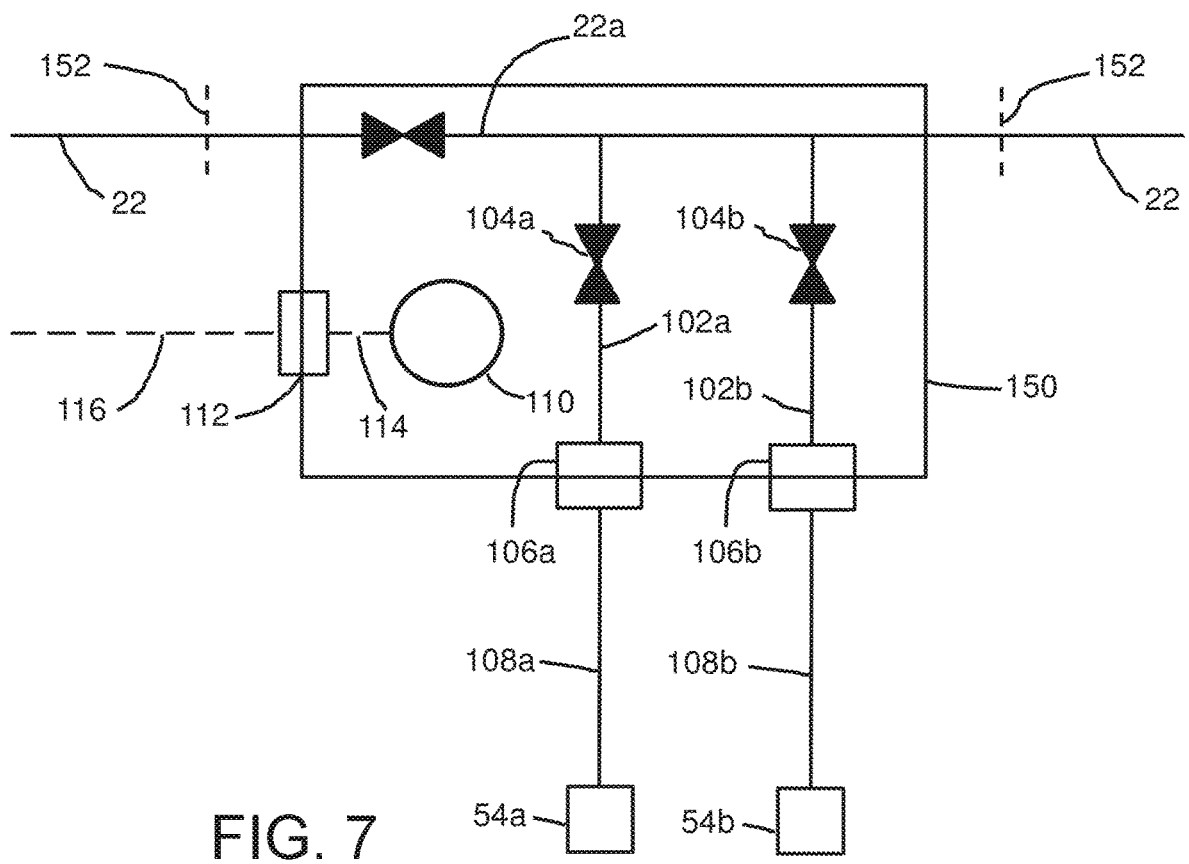
FIG. 7 schematically shows a first, illustrative, non-limiting embodiment of a pipeline integrated manifold (PLIM) in accordance with the invention.

Referring to FIG. 7, there is shown a schematic diagram of a PLIM 150 comprising a conduit 22a (such as a length of pipe) whose opposed ends form a pair of structurally and fluidically interconnected ports 152 by which the PLIM 150 may be structurally and fluidically integrated into a pipeline 22. The parts of the pipeline 22 at either end of the conduit 22a may be connected to the ports 152 in any suitable manner, e.g. by welded or other (e.g. flanged) joints. The ports 152 are preferably axially aligned, so that the attached parts of the pipeline 22 lie substantially in a straight line. This is of assistance for installing the PLIM as part of a pipe laying operation. The coaxially aligned port arrangement minimises any bending stress being imposed on the pipeline and PLIM during deployment, as a result of structural incorporation of the PLIM, and also facilitates passage of the pipeline and PLIM through the (generally linear) firing line on the pipe laying vessel. The overall tensile and bending strengths of the PLIM (and preferably of the conduit 22a and its end connections) are preferably at least equal to those of the pipeline 22, so that the PLIM does not form a structurally weak point when connected into the pipeline. The welding or other connection may take place in the firing line of a pipe laying vessel of known kind (particularly J-lay or reel-lay), so that the PLIM may be deployed to the sea bed together with the pipeline 22. The PLIM may be landed on and secured to a pre-installed foundation, but preferably includes an integrated foundation, e.g. a skirted mudmat with or without folding wings (not shown). As the foundation is installed together with the PLIM, the landing location of the assembly does not need to be so accurately forecast—there is no question of having to land the PLIM accurately on a pre-installed foundation.

The conduit 22a has a pair of branches 102a and 102b, controlled by respective isolating valves 104a, 104b within the PLIM 150. An optional valve is also shown in the conduit 22a. The other end of each branch terminates at a respective hub connector 106a, 106b, mounted to the structure of the PLIM 150. The hub connectors 106a, 106b may fluidically connect the branches 102a and 102b to the production outlets of respective subsea christmas trees 54a and 54b by respective spools 108a, 108b. Rather than the two shown in FIG. 7, only a single branch, isolating valve and hub connector (or more than two branches, isolating valves and hub connectors) may be provided; for connecting to only a single XT via a single spool (or to more than two XTs via more than two respective spools). Rather than carrying production fluid, the pipeline 22 and spools 108a, 108b may for example carry water for supply to water injection wells served by the XTs 54a, 54b.

The PLIM 150 also comprises a sensor or sensing assembly 110 for sensing process conditions within the pipe 22a and/or within the pipe branches 102a and/or 102b, or sensing equipment condition, or sensing ambient conditions within the PLIM or at the seabed. Accordingly, the sensing assembly may comprise appropriate sensors attached to or within the pipe and pipe branches. In the interests of clarity, these sensors and their connections are not shown in FIG. 7. The sensors may be configured to sense, for example, pressure, temperature, flow rate, solids content, erosion or pH of the production fluid, pig detection, or any desired combination of these. In the case of flow rate, a multi-phase flow meter may be used to measure the flow rates of any or all of the phases of the production flow at any or all of these locations. The sensor or sensing assembly 110 is linked to the service line connection 112 by a signal transmission loom 114 internal to the PLIM 150. A service line 116 is coupled to the signal transmission loom 114 via the service line connection 112 and transmits the signals from the sensor(s) of the sensor assembly to a surface monitoring facility, e.g. at a topside production facility or onshore. The signals in the service line may be electrically transmitted (twisted pair or coaxial conductor configurations, or combinations thereof), and/or transmitted optically using fibre optics. The signals may be sent over a single or over parallel transmission paths, may be multiplexed and may be analogue or digital, i.e. of any suitable form known to those skilled in the art. The service line 116 and loom 114 may also incorporate conductors for electrical power transmission to the sensing assembly 110 and to other components within the PLIM 150. The service line 116 and loom 114 may also transmit control signals from the surface facility, e.g. to control the operation of the sensing assembly 110 or other components within the PLIM 150.

Figure 8:
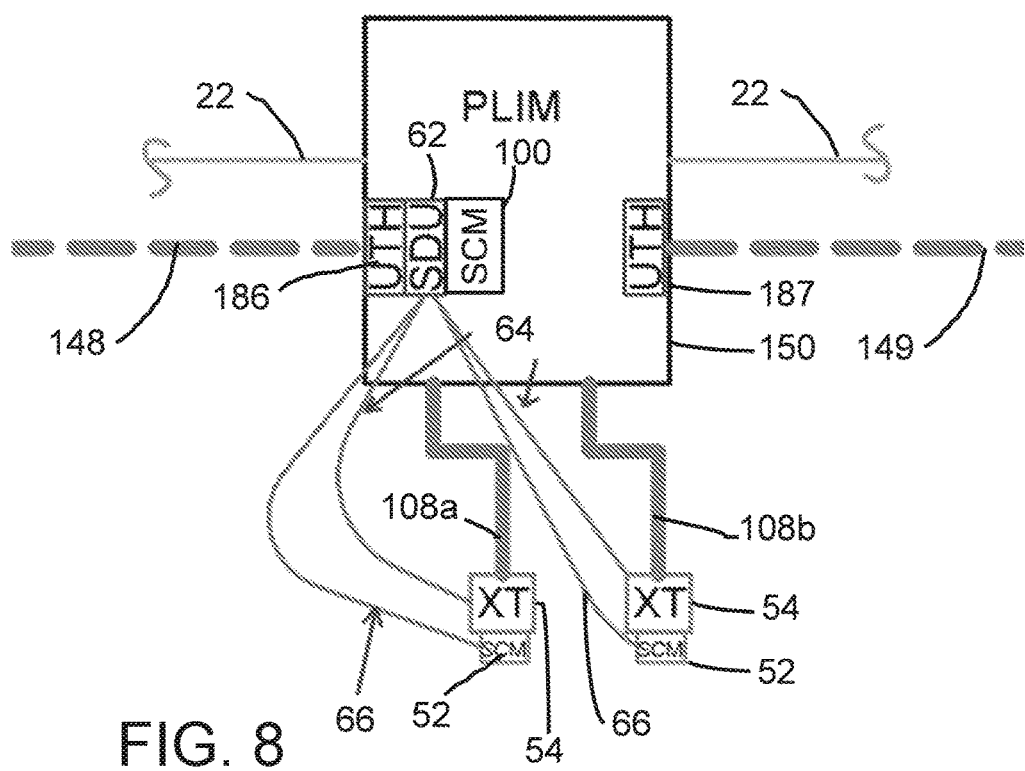
FIG. 8 schematically shows a second illustrative, non-limiting embodiment of such a PLIM.

A second PLIM 150 embodying the present invention is shown schematically in FIG. 8. The internal conduit 22a, branches 102a, 102b and hub connectors 106a, 106b for the tree connecting spools 108a, 108b shown in FIG. 7 are omitted in FIG. 8 in the interests of clarity, but will be provided in practice in this embodiment. In the embodiment of FIG. 8, the service line connected to a surface supply or control or monitoring facility is an umbilical 148. The PLIM 150 comprises a UTH 186 mounted to or integrated within its structure, at which the umbilical 148 is terminated. The UTH 186 service connections are connected in parallel internally of the PLIM 150, by suitable cables and conduits (not shown in the interests of clarity), to corresponding service connections in a second (optional) UTH 187, allowing the umbilical 148 to be daisy chained to a second umbilical 149 connected to the second UTH 187, e.g. for future field expansion.

Services provided via the umbilical 148 are distributed via an SDU 62 connected to the UTH 186 internally of the PLIM 150 for provision of such services, and mounted to or integrated into the PLIM structure. For example, hydraulic, chemical injection and gas lift services may be provided via HFLs 64 connected between the SDU 62 and the XTs 54. Similarly, electric power and data transmission services may be provided by EFLs 66 (including optical fibres if required) connected between the SDU 62 and tree-mounted SCMs 52. Thus the umbilical 148 terminates directly at the PLIM 150, thereby eliminating the necessity of a separate structure for the UTH 186 and SDU 62.

Control and chemical distribution is made within the PLIM 150. The trees 54 provide hydraulic control/actuator power to the PLIM via multi-bore spools 108a, 108b, which also serve to convey the production fluid from each tree to the PLIM. The multi-bore spools 108a, 108b may also carry chemicals for injection or lift gas from the UTH and SDU 186, 62 to the XTs, via HFLs. Mono-bore spools and separate EFLs/HFLs could also be used, but a multi-bore spool and an associated multi-bore connecting hub facilitates a more compact and lighter PLIM.

Additionally or alternatively the PLIM may comprise its own (e.g. on board) SCM 100, with electrical, optical and hydraulic power and data services obtained directly from the UTH 186 or SDU 62. The PLIM's SCM 100 may control/operate valves and actuators within the PLIM. The abovementioned services may also be distributed from the PLIM to XTs, tree mounted SCMs or any other equipment external to the PLIM and requiring such services. The services may be distributed via FLs (electrical, hydraulic or optical as appropriate) connected between the PLIM SDU 62 and the external equipment. Additionally or alternatively these services may be distributed via the multi-bore spools 108a, 108b and corresponding multi-bore hub connectors otherwise similar to the hub connectors shown in FIG. 7. The PLIM 150 shown in FIG. 8 may additionally include a sensor or sensing assembly as described above with reference to FIG. 7; the sensor or sensing assembly in this case being linked to the UTH 186 or SDU 62 by a signal transmission loom (not shown) internal to the PLIM 150.

In a preferred embodiment the PLIM field architecture thus comprises a pipeline integrated manifold; an umbilical termination at the PLIM, including distribution of the umbilical-transmitted services (e.g. control system supply/return lines, control and sensor data lines, chemical and lift gas supplies); multi-bore spools from the trees to the manifold or mono-bore spools with or without piggy-backed electrical or optical FLs. For convenience during installation, a flying (or pigtail) lead deployment frame or other stowage may also be included with the PLIM.

The PLIM is therefore able to maintain the functionalities of a traditional stand-alone (not integrated into the pipeline) subsea manifold:

It commingles and directs produced fluids from multiple wells into one or more flowlines;

Pigging capability; the PLIM main headers (e.g. pipe 22a, FIG. 7) can be configured to be piggable. This is not possible in the case of prior art manifolds which are connected to the pipeline via a spool, rather than being integrated into the pipeline. A pig launcher may also be provided. Particularly although not exclusively, a PLIM used at the end of a flowline or pipeline (see below) has the capability of connecting an external pig launcher to a dedicated hub on the structure;

Subsea tree spools and umbilical connections by means of diver assisted/diverless tie-in systems;

Provision of support for the contained pipework, valves and equipment;

Provision of protection for the contained equipment from dropped objects and overtrawling;

Distribution of control, chemical, data and power lines from main umbilical to the trees;

Provision of instrumentation for process/equipment condition/environmental monitoring;

Provision of pig detection instrumentation.

Since the PLIM is integral to the flowline, there is reduced capability for complete structure retrieval. However, it can incorporate retrievable equipment, e.g. SCM, MPFM, etc. or have retrievable components located in a separate subsea structure, e.g. stand-alone equipment.

Figure 9:
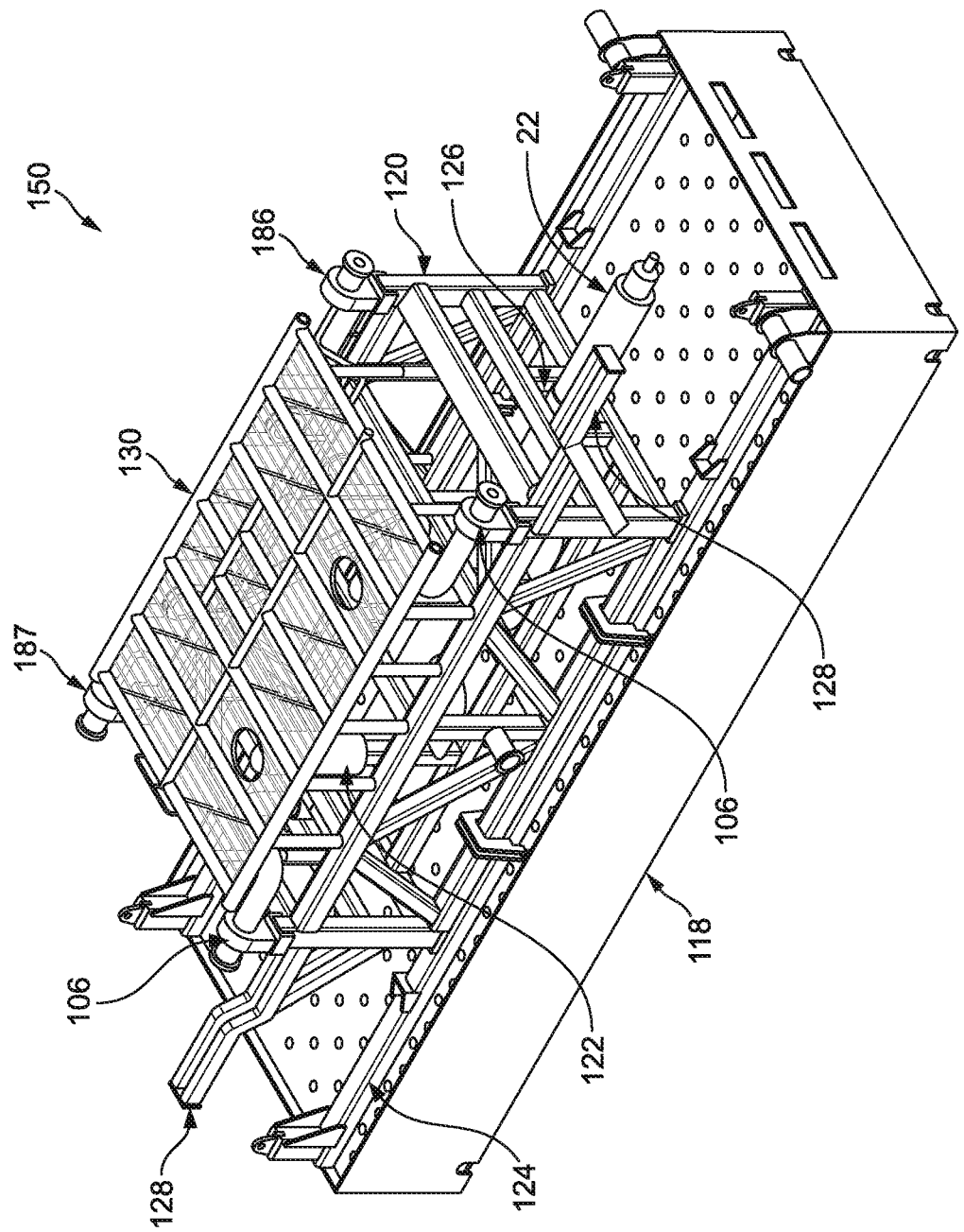
FIG. 9 is an illustrative, non-limiting perspective view showing the general arrangement of such a PLIM.

FIG. 9 presents a perspective view of the general arrangement of an illustrative PLIM embodying the present invention. The PLIM 150 is installed on the seabed as part of the flowline 22 which is laid from a pipe-lay vessel. The foundation 118 includes a mudmat plate and skirts for deployment in soft clay soils. Other foundation types may be provided as appropriate to the seabed conditions. A structural frame 120 e.g. formed from welded steel tubing houses and supports the piping and valves 122. The structural frame (including any structural frame mentioned in this document in connection with embodiments of the invention) may take any suitable form, e.g. lattice, chassis, monocoque, box section, enclosure with strong points, as required to support the weight of, or retain the PLIM components. It must also serve to support any weight and other forces imposed upon it by the pipeline either during deployment or in service after installation. As also mentioned later on, the pipeline imposed loads may be shared between the structural frame and conduits within the structural frame, or may be carried primarily or solely by either of those components. The structural frame 120 may be located on guide rails 124 which allow for axial movement between the structural frame 120 and the foundation 118 caused by pipeline expansion/contraction. In the configuration shown in FIG. 9, an anchor flange 126 is welded (or otherwise suitably secured, e.g. bolted) to both the structural frame 120 and the pipeline 22 for installation purposes and for load transfer between the pipeline and structural frame in operation. Additional support may be provided via a guide (also welded or otherwise suitably secured to the structural frame 120) through which the pipeline is free to move, but which constrains the pipeline against lateral movement. During installation, the weight of the PLIM 150 passes through the anchor flange 126 and is carried by the pipeline at the vessel, together with the catenary weight of the pipeline 22 extending to the seabed. Some of this weight may be compensated for by temporary buoyancy structures during deployment of the PLIM and associated pipeline to the seabed. Such buoyancy structures may be attached to the PLIM at or near the sea surface, e.g. soon after the PLIM has been deployed from the pipe-laying vessel, but after it has passed through any restricted parts of the deployment path aboard the vessel (e.g. a moonpool, stinger or ramp). The guide supports the PLIM during deployment and prevents it from skewing relative to the pipeline. Once the PLIM is deployed at the sea bed, sliding movement is permitted between the guide and the pipeline, whereby stresses and strains in the pipeline are not transmitted to the PLIM's structural frame.

A pair of multi-bore production hubs 106 are attached to the structural frame 120 and deliver production fluid to the pipeline 22 via corresponding multi-bore spools (not shown in this Figure) that are connected to corresponding XTs. These spools and the multi-bore production hubs 106 also facilitate the connection of chemical, gas lift and hydraulic lines to the XTs. The multi-bore spools and multi-bore hubs 106 may also facilitate connection of hydraulic lines (under control of the tree-mounted subsea control modules (SCMs)) from the trees to the valves on the PLIM, e.g. via logic caps on the PLIM (not visible in this Figure; see 132, FIGS. 10a and 134, FIG. 10b). These logic caps are optional, allowing reconfiguration of chemical and hydraulic supply paths in case of component failure. The multi-bore spools may be rigid, i.e. formed from metal tubing. They nevertheless can be designed to provide sufficient flexibility to accommodate the movement of the structural frame 120 on the guide rails 124. Alternatively, flexible spools may be used (i.e. spools of hose-like, or multiple hose-like, construction). The termination head of the rigid spool may be landed on an outrigger 128 prior to the connection being made with the associated production hub 106. Other connection/pre-installation aids may be used, as appropriate to the spool and spool termination head and production hub type and configuration. A part of the structural frame 120 adjacent to where the flowline enters/exits the PLIM, may be used to support the flowline. The height of the flowline in the structural frame relative to the sea bed may be kept to a minimum (to limit pipeline free span and associated loads on both the pipeline and the structural frame). Low profile supports or a catamaran shaped foundation may be used to get the pipe section within the PLIM close to or on the seabed. The pipe may be supported at or close to the sea bed between two separate portions of such a catamaran shaped foundation.

The multi-bore umbilical termination head (UTH) hub 186 is attached to the structural frame 120 and delivers electrical, chemical and hydraulic lines as well as fibre optics (if required) from the platform or other surface facility to the PLIM 150. These lines may be routed to the SCM on the relevant XT via the logic caps (132, FIG. 10a; 134, FIG. 10b) and the corresponding multi-bore production hub 106. The control and chemical supplies can be connected from one PLIM to another via an optional future multi-bore umbilical termination head hub 187 on the structural frame 120. Services may also be routed back from the XTs or tree mounted SCMs to the PLIM via the multi-bore spools and multi-bore production hubs 106. Additionally or alternatively, the PLIM may be provided with its own SCM (e.g. mounted to or within the PLIM structure), so that services are distributed from the PLIM and control/operation of valves and actuators within the PLIM is carried out via the PLIM SCM, e.g. as described above with reference to FIG. 8. Use of the multi-bore hubs provides for a compact and therefore potentially lightweight design and allows for integration of fluid service lines into the multi-bore spools. This allows for connection of the PLIM to associated XTs or other external equipment with fewer or even no HFLs. Even electrical and/or optical connectors may be integrated into the multi-bore hubs 106 for connection with corresponding lines integrated into the multi-bore spools. Additionally or alternatively, EFLs can be used, connected to an SDU on the PLIM as shown in FIG. 8 and e.g. piggy-backed on the multi-bore spools. A protection frame 130 may be attached to the primary steel structural frame 120 to protect the valves and equipment from dropped objects, or to provide over-trawl protection if required.

Figure 10:
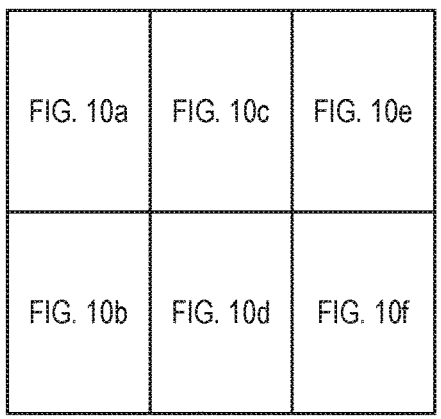
FIGS. 10-10f show, separated into seven parts for clarity, an illustrative, non-limiting process and instrumentation diagram of such a PLIM.
Figure 10:
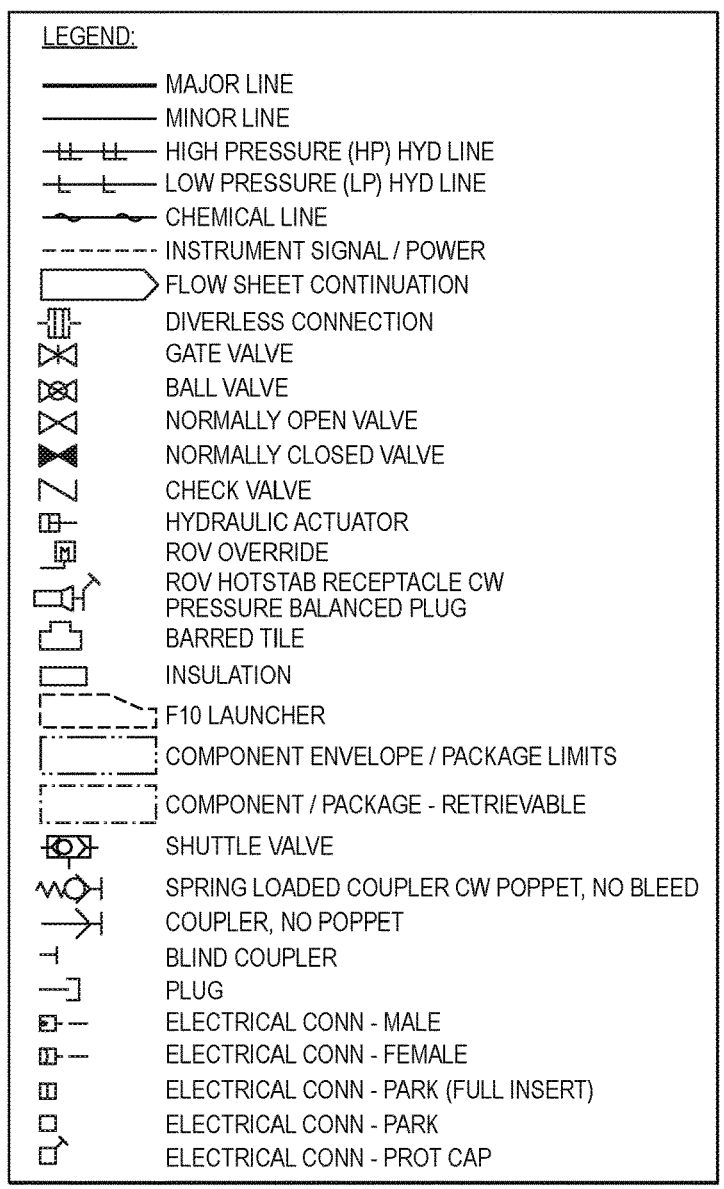
Figure 10A:
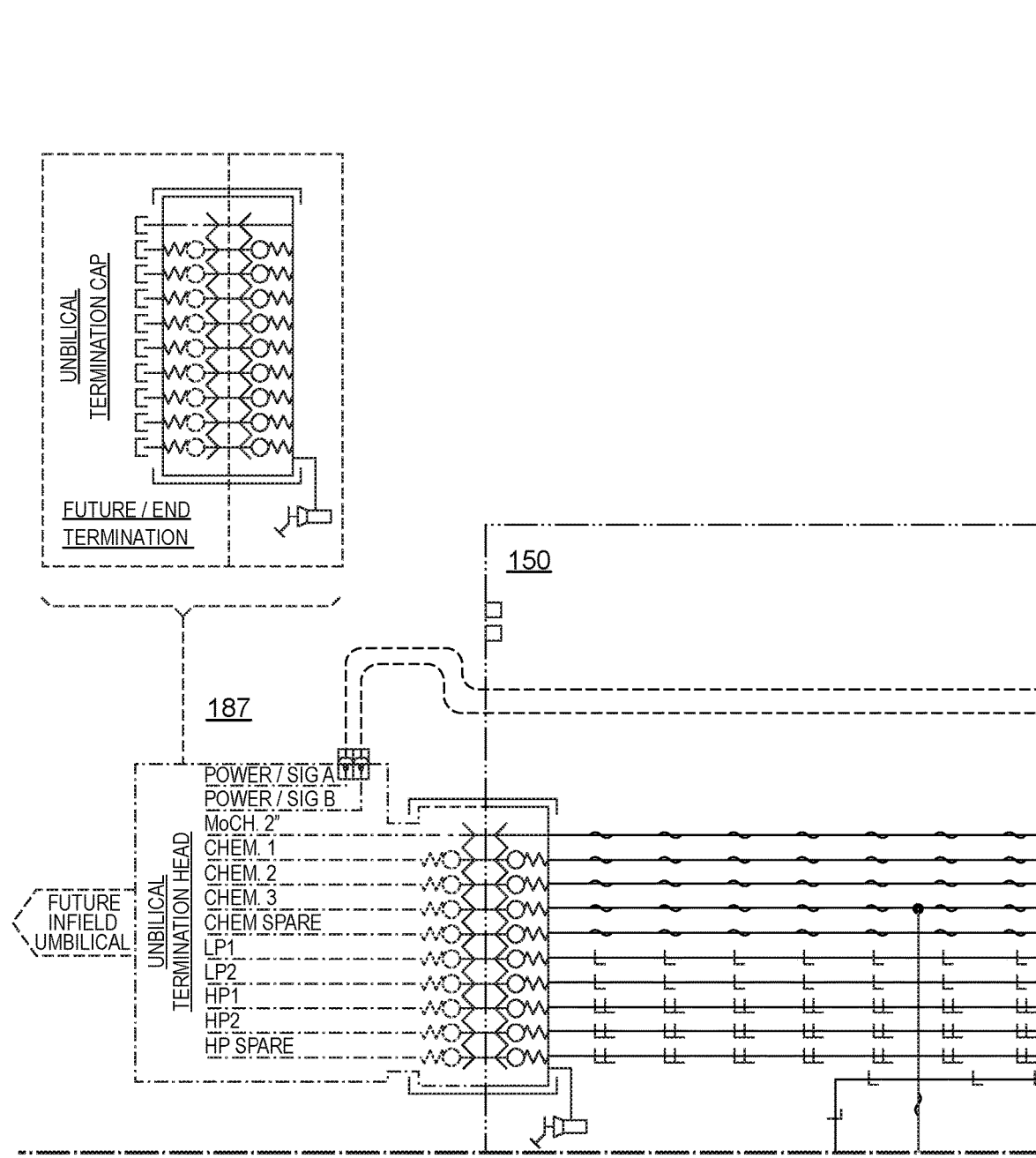
Figure 10B:
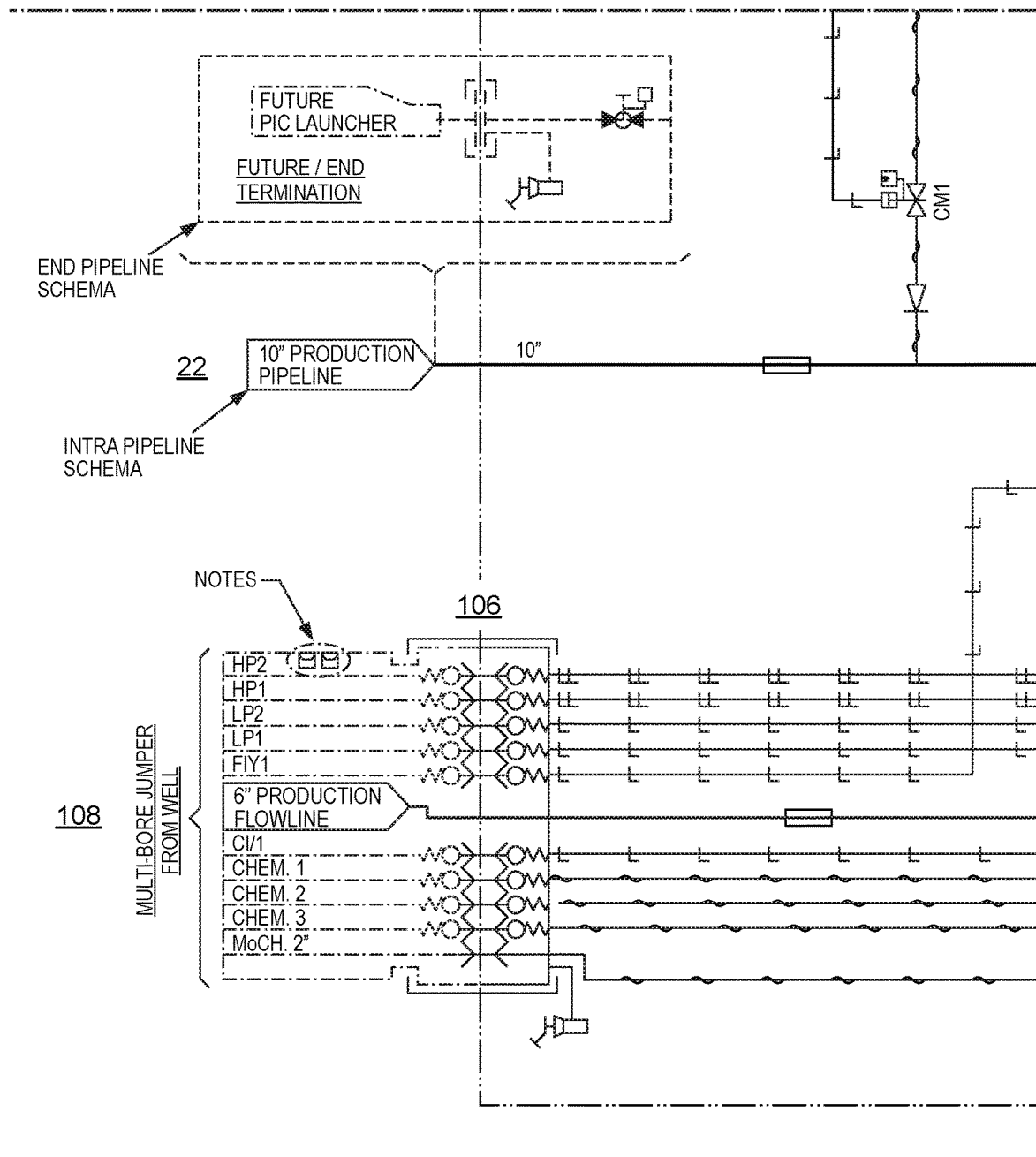
Figure 10C:
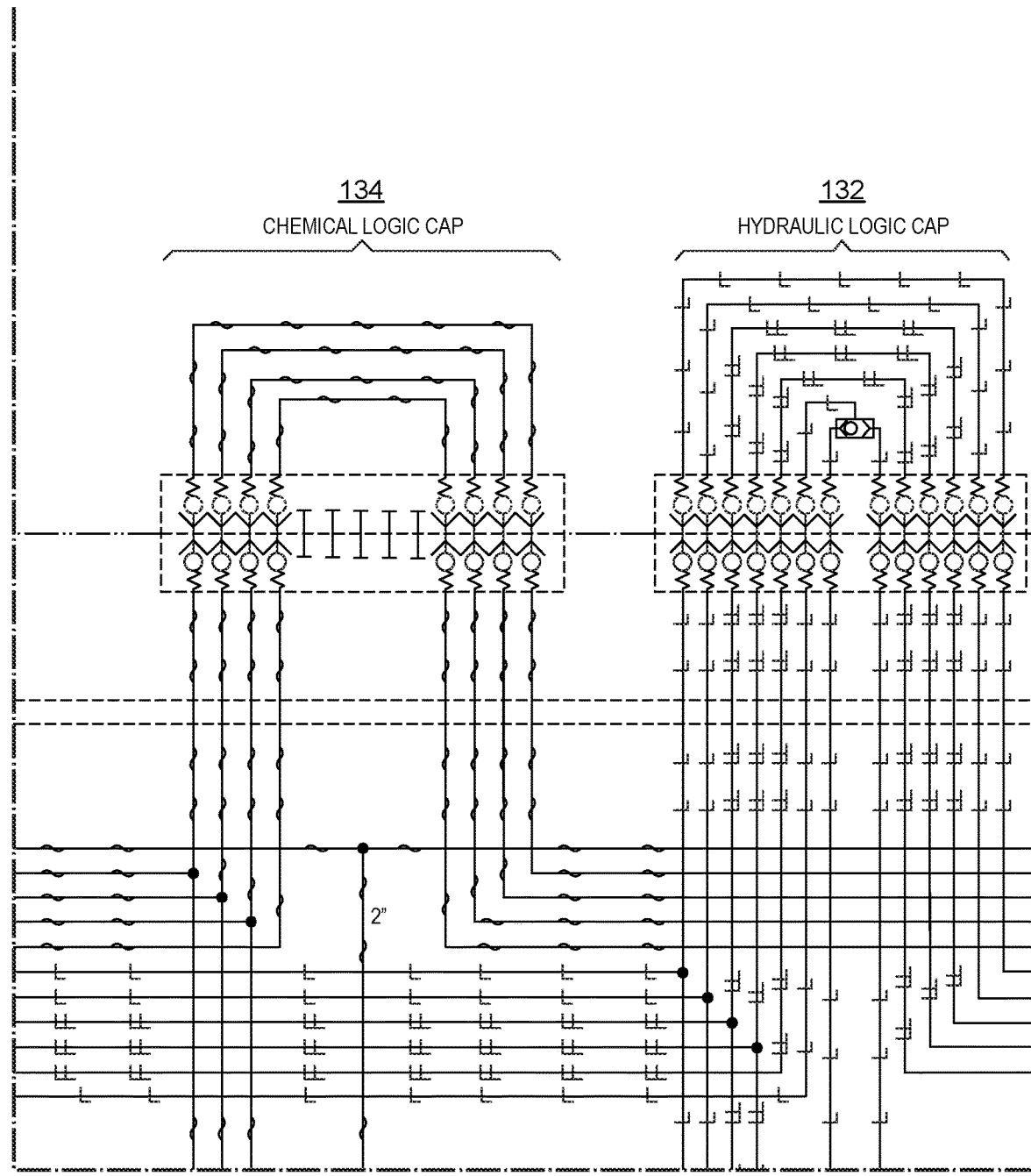
Figure 10D:
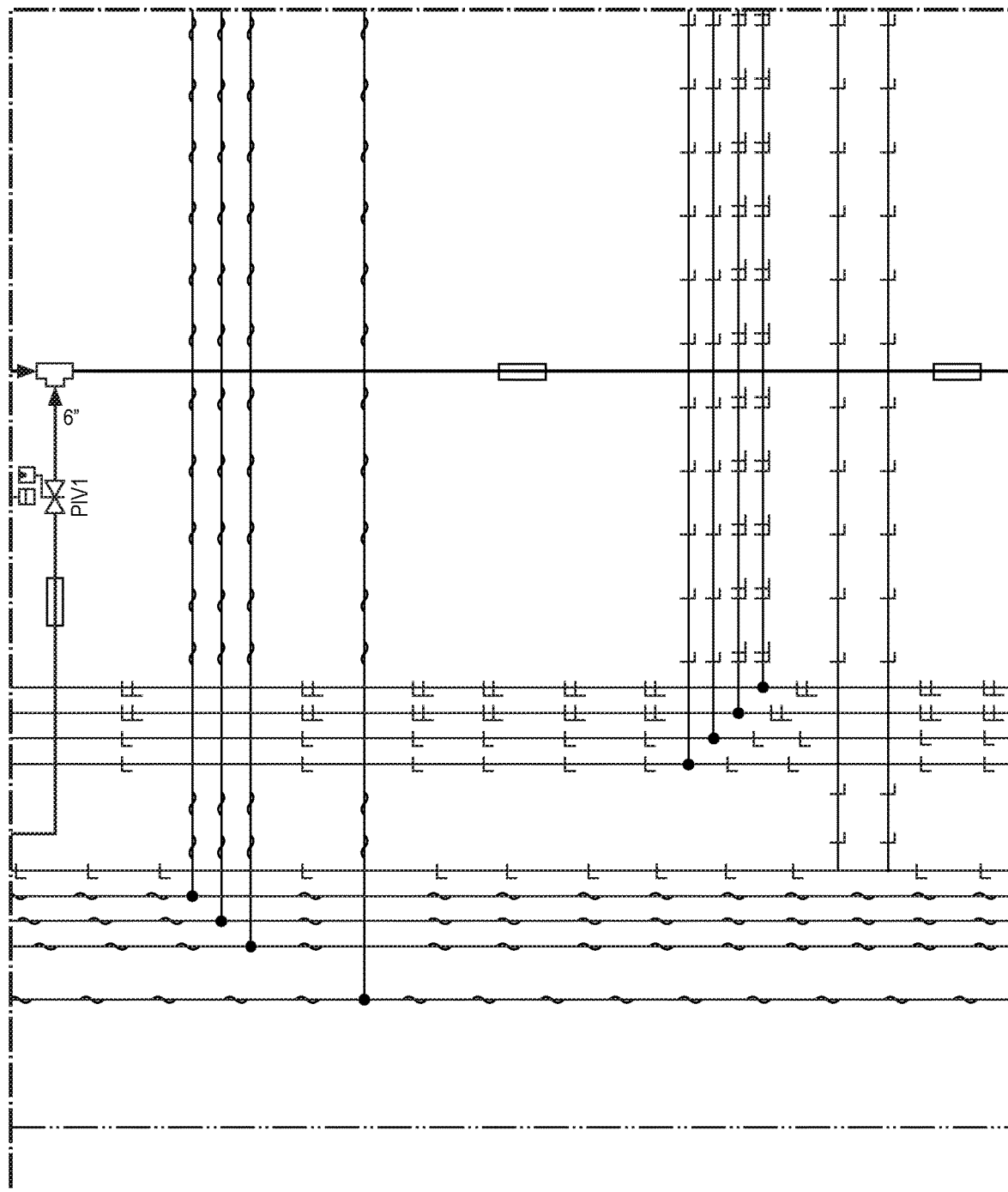
Figure 10E:
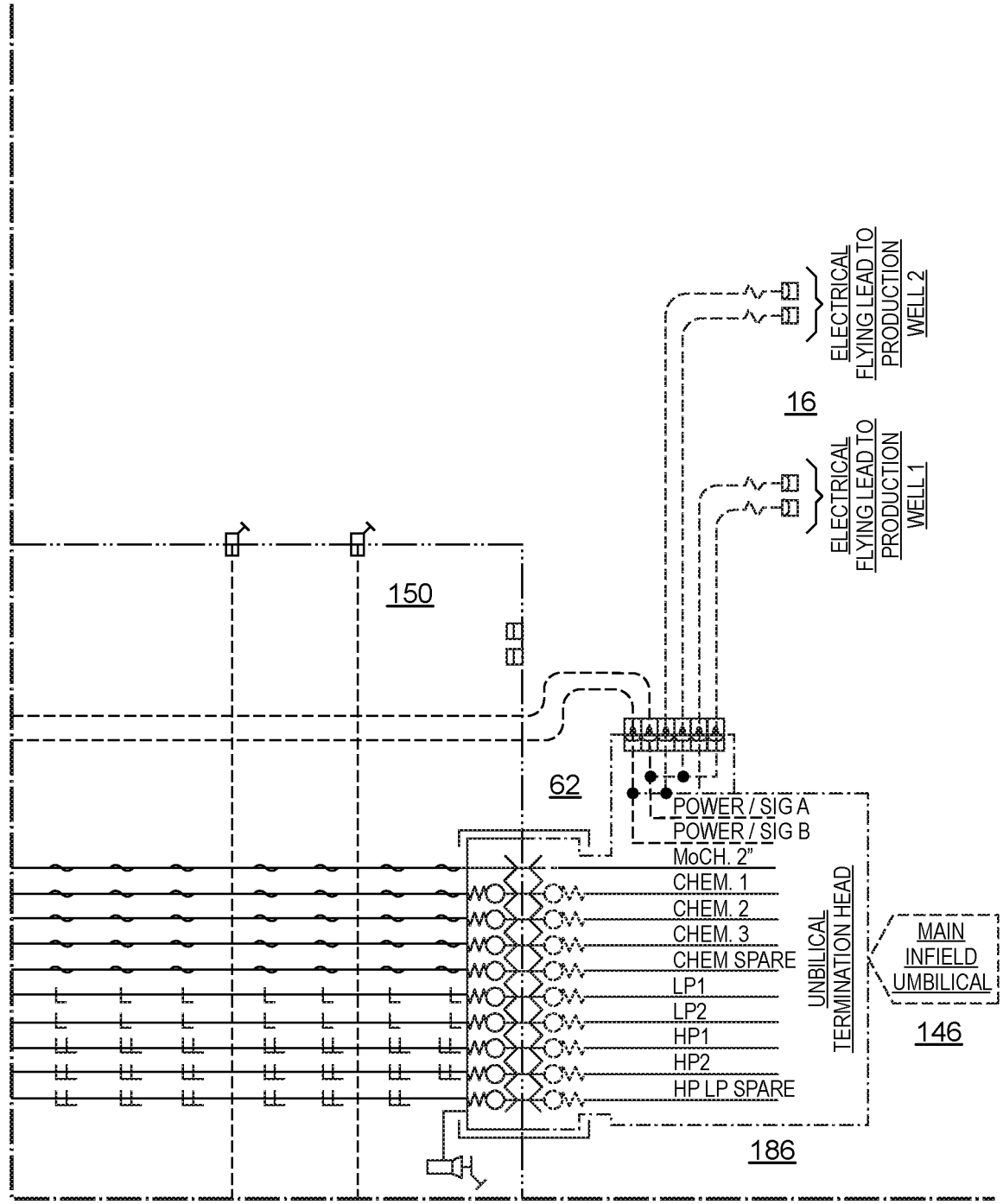
Figure 10F:
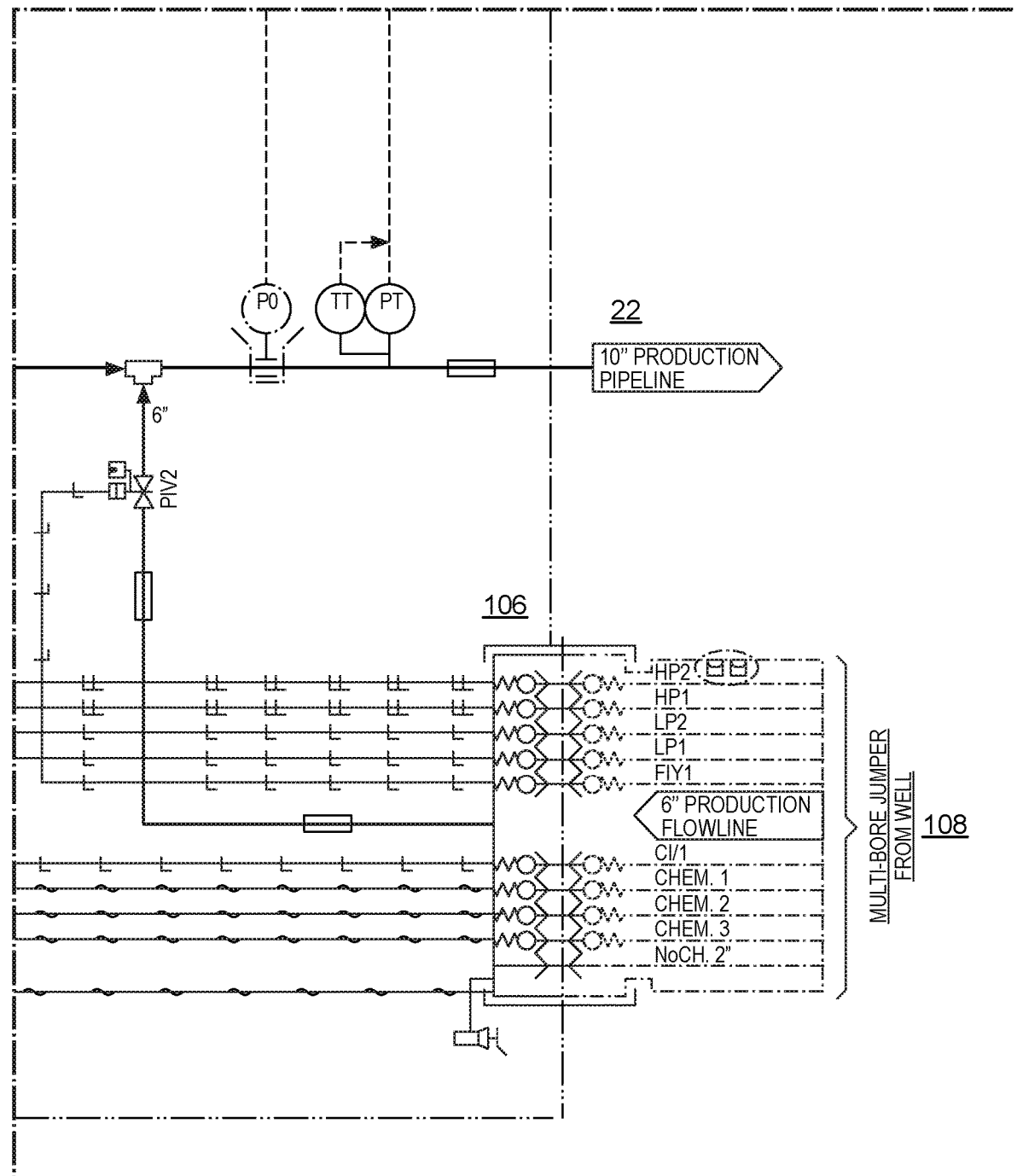

FIGS. 10a and 10b together show a process and instrumentation diagram for the two-slot PLIM of FIG. 9.

PLIMs as shown in FIGS. 7-10b may provide the following benefits in terms of savings in fabrication and equipment costs and simplified installation over conventional stand-alone subsea manifolds and associated field architectures:

Fabrication savings:
An ILT is not required;
A rigid/flexible spool to connect the offline manifold to the ILT is not required;

Equipment savings:
Fewer connectors required;
Fewer large bore valves required;
Installation savings:
Metrology (for rigid spool only) and installation of rigid/flexible spool is not required;
Installation of the PLIM as an in-line structure from a pipe-laying vessel (no separate lifts required for a manifold).

Figure 11:
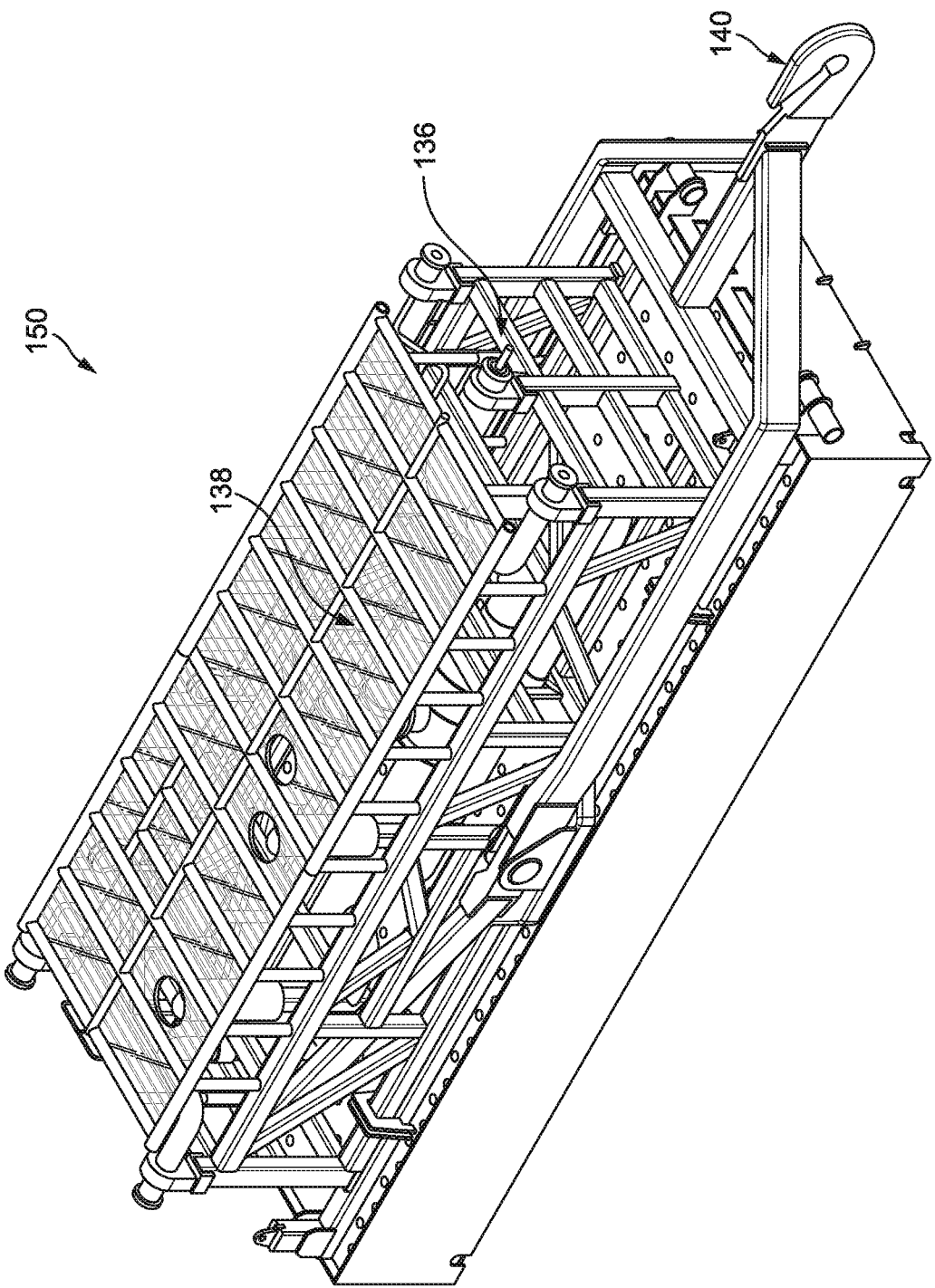
FIG. 11 corresponds to FIG. 9, but shows a third illustrative, non-limiting embodiment.
Figure 12:
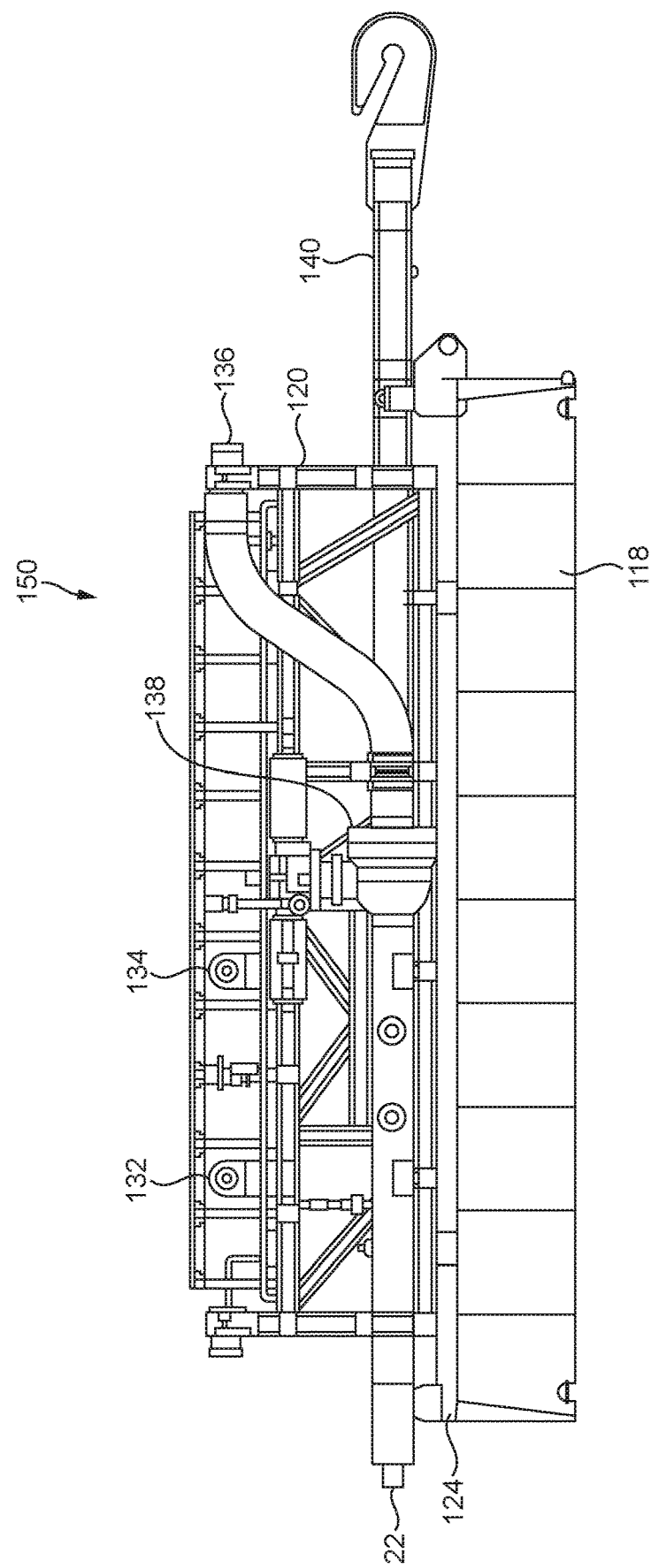
FIG. 12 is a side view of the PLIM shown in FIG. 11.

A PLIM embodying the invention can also be installed as an end-of-line structure, optionally with facilities for pigging the pipeline towards or from the oil and gas platform. To provide such pigging facilities, the PLIM 150 may have the following extra components as shown in FIGS. 11 and 12:

- A valve 138 (self-powered or ROV operated) in the main pipe, to close an openable end of the flowline 22 (i.e. to open and close the end of the conduit or main header within the PLIM with which the flowline is fluidically integrated);
- A yoke and hook arrangement 140 for installation purposes (similar to a PLET);
- Optionally an extra inboard hub 136 at the openable end of the flowline, to which the pig launcher/receiver may be connected. Additionally or alternatively, the openable end of the flowline may be used as a connection point for future field developments.

Figure 13A:
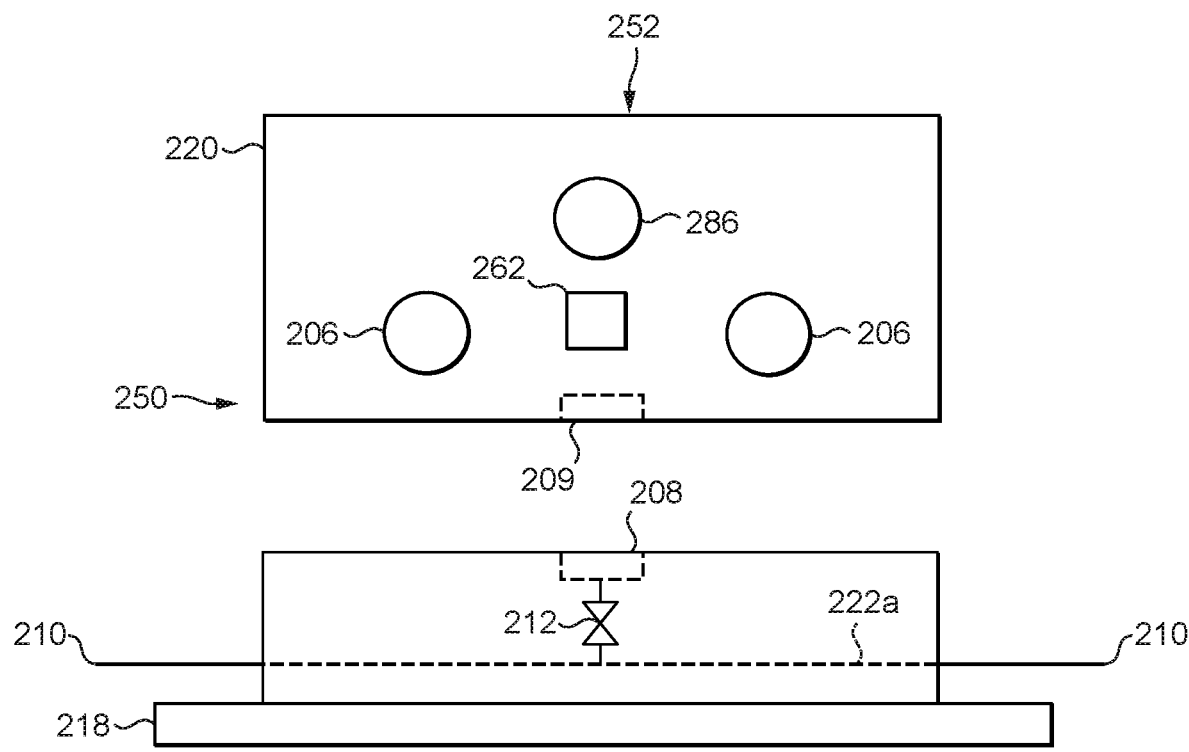
FIGS. 13a-d are schematic views showing fourth, fifth, sixth and seventh illustrative, non-limiting embodiments.

FIG. 13a schematically shows yet another illustrative and non-limiting PLIM embodying the invention. Under this arrangement, the PLIM comprises a main pipe 222a integrated (e.g. welded or connected by bolted flanges) into the pipeline for installation from a standard pipe laying vessel as described above, and a retrievable module connectable to an inboard hub provided on the main pipe. The PLIM 250 shown in FIG. 13a therefore includes the following components:

- Retrievable module 252 which houses the critical items that may require servicing during the lifetime of the field, e.g. an MPFM or SCM. As shown the module 252 also includes multi-bore production hubs 206 for hook-up to XTs via multi-bore rigid or flexible spools (not shown). The module may be connectable to an umbilical (not shown) via a hub 286 for service provision as described above. The various module components are supported in a structural frame 220.
- Main pipe 222a welded or otherwise structurally connected at its ends 210 to the pipeline while on board the pipe-laying vessel. These ends thus form coaxially aligned ports by which the PLIM 250 may be structurally and fluidically integrated into a pipeline. The main pipe 222a is provided with an upwardly facing inboard hub 208 to which the retrievable module 252 is wet-mate connectable. An isolation valve 212 is provided in the hub branch immediately adjacent to the hub 208.
- A foundation 218 attached to the main pipe, hub and/or valve, to support these and the retrievable module 252.
- An optional SDU 262 for hook-up of EFLs to tree mounted SCMs, or other external equipment, as dictated by each particular field layout. The SDU may optionally also provide HFL connectivity to XTs etc. if required, in addition to or instead of the multi-bore hubs 206 and corresponding spool.

Under this arrangement:
- The module 252 can be retrieved for maintenance, modifications or equipment replacement;
- The module 252 can be replaced to accommodate additional subsea well connections;
- Field expansion can be supported by installing the PLIM foundation 218, upwardly facing inboard hub 208 and isolation valve 212 (excluding the retrievable module 252) at future well locations for phased field development. The retrievable module 252 can be installed separately onto the hub 208 at a later stage as and when the field is further developed. Alternatively, there is flexibility for the retrievable module 252 to be installed together with the remainder of the PLIM 250 and the pipeline, from the pipe-laying vessel and from the very start, as described above for the other PLIM embodiments. The retrievable module may be connected to the corresponding hub prior to welding or otherwise connecting the base module main pipe into the pipeline; or immediately after such connection and while the base module is still in the firing line aboard the pipe-laying vessel. The module 252 can be installed and retrieved without any interruption to the flow in the pipeline into which the main pipe 222a is integrated.

Figure 13B:
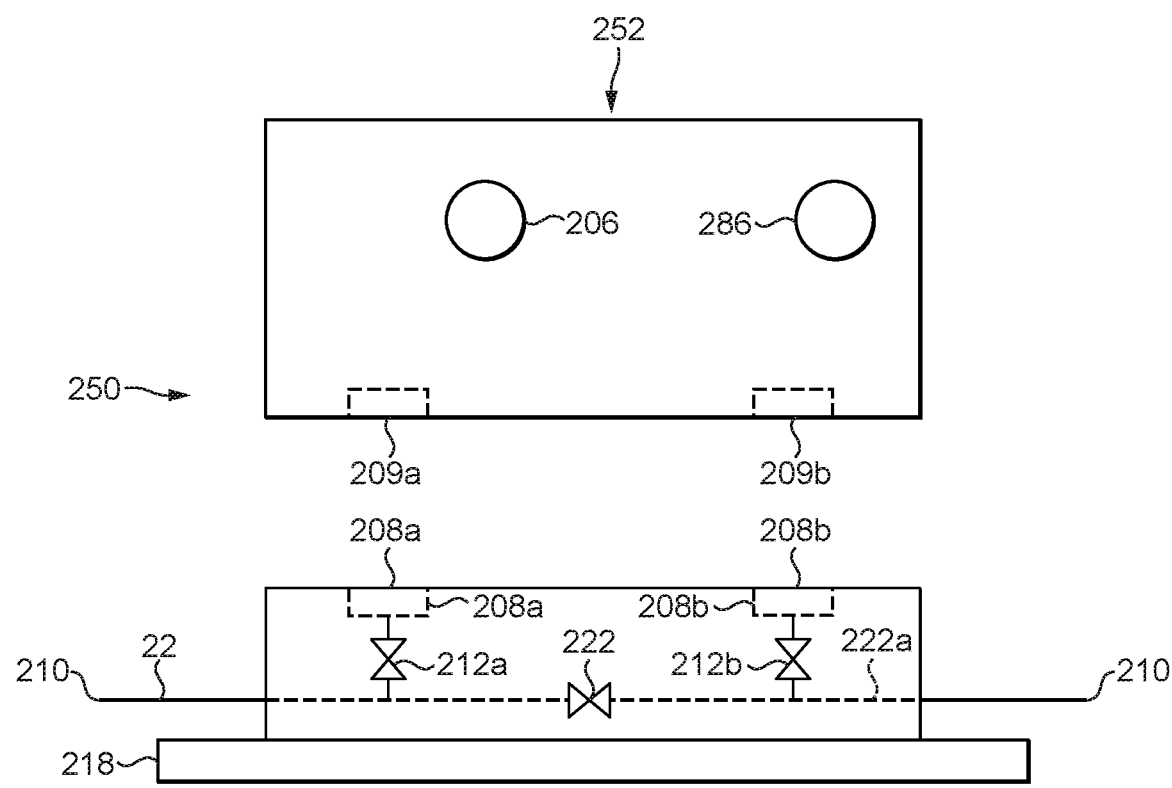

FIG. 13b diagrammatically illustrates a variant of the PLIM 250 of FIG. 13a. In the arrangement shown in FIG. 13b, two upwardly facing inboard hubs 208a, 208b and corresponding isolation valves 212a, 212b are used to releasably connect the retrievable module 252 to the base module. An isolation valve 222 in the main pipe 222a is closeable to direct flow through the retrievable module. The hubs 209a and 209b, may be interconnected within the retrievable module 252 e.g. by a header loop or other suitable conduit (not shown), so as to allow through-flow of the fluid carried by the pipeline 22. The retrievable module 252 further comprises a single multi-bore production hub 206 of similar function to the two hubs 206 shown in FIG. 13a and the multi-bore production hubs described with reference to earlier embodiments. Any suitable number of production hubs may be provided, as dictated by field requirements. These may change over the lifetime of the field, but the retrievable module 252 provides flexibility to configure the retrievable module to evolving conditions during the field life or for phased field development. A hub 286 for umbilical connection as discussed above with reference to earlier described embodiments is also shown schematically in FIG. 13b. An SDU as described above may also be provided; although such is not shown in FIG. 13b, as it is equally possible for the relevant chemical, hydraulic, electrical, optical etc. services to be conveyed via (a) multi-bore spool(s) connected to the multi-bore hub(s) 206.

Figure 13C:
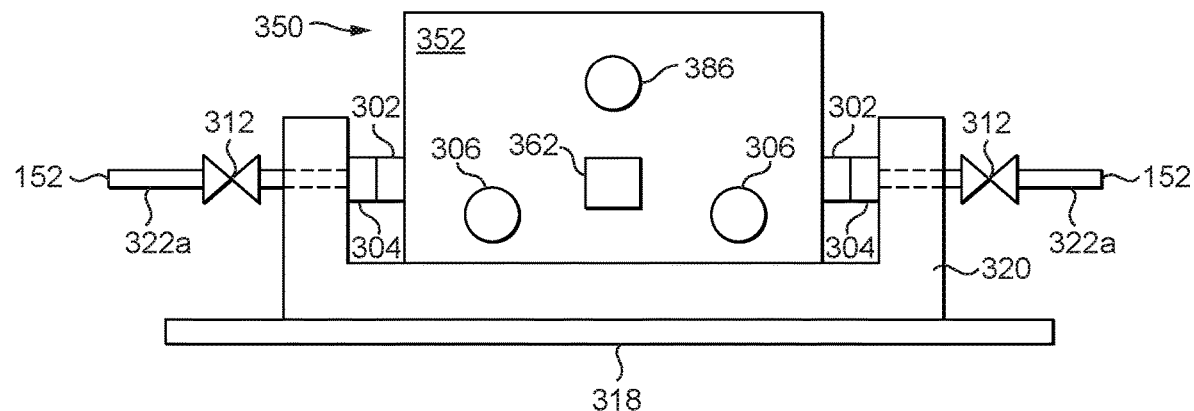

FIG. 13c diagrammatically illustrates a further PLIM 350 according to this disclosure. The PLIM 350 has a retrievable module 352 releasably coupled to a structural frame 320 by suitable mechanical fasteners or latches (not shown). The structural frame is mounted to a foundation 318 such as a mud mat. The mounting may allow limited relative sliding movement between the structural frame and foundation, similarly to the arrangement described and shown with reference to FIGS. 9, 11 and 12, to accommodate thermal movement of the pipeline. A pair of pipe stubs 322a is mechanically fixed to the structural frame 320. The outer ends of the pipe stubs are in coaxial alignment and form ports 152 for the attachment of the pipeline ends, e.g. by welding or flanged connection (not shown), aboard the pipe laying vessel. A pair of hub connectors 302 at opposite ends of the module 352 fluidically interconnects with a complementary pair of hub connectors 304 provided one each on the inboard ends of the pipe stubs 322a. Alternatively (although such a configuration is not shown in FIG. 13c) the hub connectors 302/304 at either end of the manifold assembly may be substantially vertically orientated when the manifold 350 is in the attitude which it will adopt when installed at the seabed; for ease of docking and removal of the retrievable module 352.

The hub connectors 302 are fluidically interconnected with one another within the retrievable module 352 by a main header (not shown), which provides flow continuity for the connected pipeline through the PLIM 350. The hub connectors 302/304 are relatively retractable so that they can be uncoupled from each other to allow retrieval of the module 352 (i.e. removal of the module from the structural frame 320); although this is not necessary in the case of substantially vertically oriented hub connectors 302/304. With the module removed, mechanical loads are still transmitted between the pipe stubs 322a by the structural frame 320. The remainder of the PLIM 350 without the module 352 may therefore be incorporated into the pipeline and deployed from a pipe laying vessel in the same way as the other PLIMs described above. At the seabed, the structural frame 320 may likewise transmit any mechanical loads in the pipeline and maintain the pipe stubs 322a and hub connectors 304 in proper alignment for reception of the module 352, even when the module 352 is absent. During such absence (e.g. because the module is scheduled to be installed at a future field development phase, or because the module 352 has been retrieved for replacement or overhaul) pipeline flow continuity may be maintained by a dummy pipe spool inserted between the hubs 304. The pipe stubs 322a preferably include isolation valves 312 to allow changeout/insertion of the module 352 or dummy pipe spool. The principle of allowing a structural framework or other structural member of the PLIM to carry some or all of the pipeline imposed mechanical loads (as well as or instead of pipework within the PLIM) may be employed in any PLIM, including any of those particularly described in this document. The linear arrangement of the removable module 352 and pipe stubs 322a may allow for a reduction in the cross-sectional profile viewed along the pipeline axis, in comparison to some other PLIM configurations.

The removable module 352 has a connection for service provision, such as a multi-bore hub 386 for coupling to an umbilical, similarly to the previously described embodiments. The retrievable module may have a further connection for service distribution as described in relation to the previously described embodiments, such as multi-bore hubs 306 for connection to XTs via corresponding multi-bore spools (not shown). These spools may also carry production fluid to the PLIM as described above in relation to previous embodiments. The module 352 shown in FIG. 13c may also be provided with an optional SDU 362 for hook-up of EFLs to tree mounted SCMs, or other external equipment, as dictated by each particular field layout. The SDU may optionally also provide HFL connectivity to XTs etc. if required, in addition to or instead of the multi-bore hubs 306 and corresponding spools.

Figure 13D:
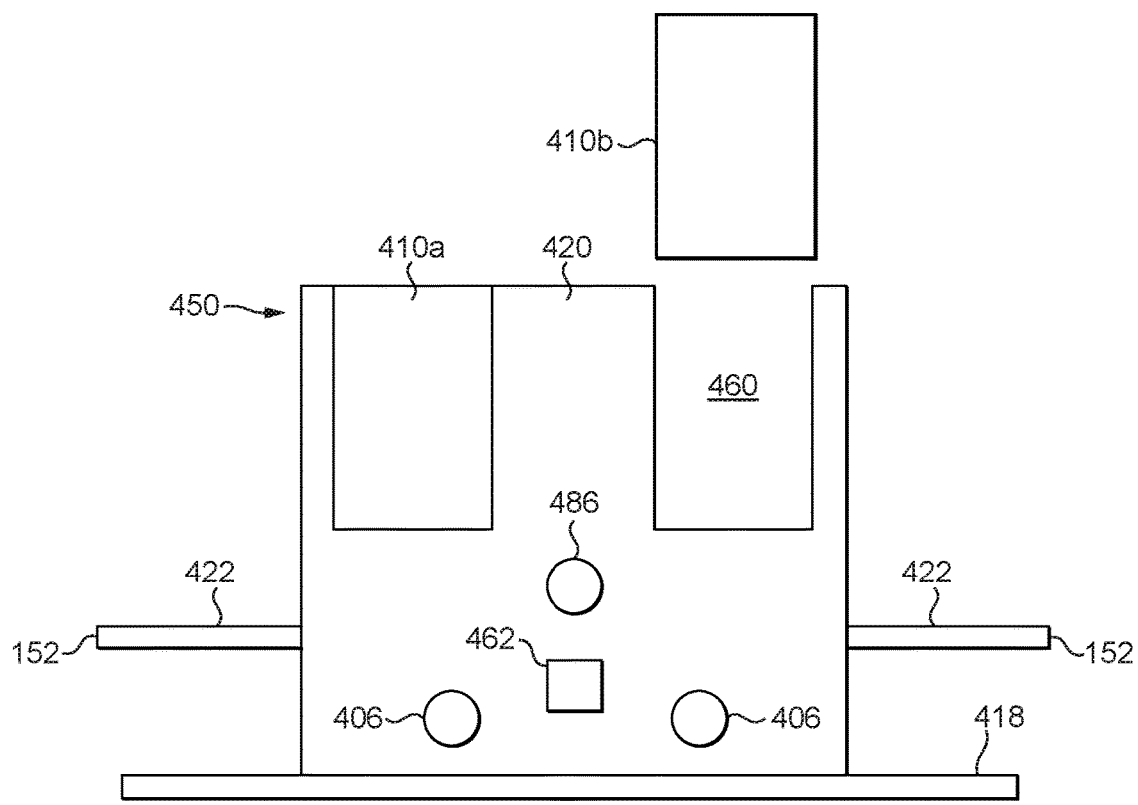

FIG. 13d is a diagrammatic representation of yet another PLIM in accordance with the present disclosure. The PLIM 450 shown in FIG. 13d has a foundation 418, structural frame 420, pipe stubs 422 (which may be protruding parts of a continuous main conduit or header pipe within the PLIM), a connection 486 for service provision to the PLIM (such as a multi-bore hub for coupling to an umbilical) and a further connection for service distribution (comprising multi-bore hubs 406 and SDU 462), similar to the corresponding components described above with respect to FIG. 13c. However, many of the components of the PLIM 450 (such as internal pipework, wiring loom, valves, valve actuators, the hubs 406, 486 and the SDU 462) are in effect permanently secured to or within the structural frame 420. In other words, these components are not easily retrievable once the PLIM has been installed subsea from a pipe laying vessel as a structurally integrated part of the pipeline in the manner described above. However, certain critical components or component subassemblies, such as a MPFM or SCM, are configured for diverless (e.g. ROV) or diver-assisted removal and retrieval and conceptually are therefore a retrievable module or modules.

For example these components and/or subassemblies may be configured to dock with the remainder of the PLIM (conceptually a main, not easily retrievable module) via suitable wet-mate interfaces. These interfaces may for example include an array of parallel-aligned, individual, fluidic, electrical or optical push-fit connectors for each fluid conduit or conductor. Therefore once any mechanical fastenings holding it in position are released, the component or subassembly may simply be pulled out of the PLIM structural frame 420. Fluid couplings at the interface may be provided with self-actuating shutoff valves which close upon disconnection of the coupling. Fitting of the component or subassembly is the reverse of removal. FIG. 13d schematically shows one such component or subassembly 410a fitted into and connected to the remainder of the PLIM. Another such component or subassembly 410b is shown removed from its docking station 460 in the main module of the PLIM.

PLIMs according to this disclosure may include additional or alternative functionalities including but not limited to the following functionalities that can be found in existing stand-alone (off-pipeline) subsea manifolds:

A test header with a retrievable MPFM for individual well flow measurement;
An ROV operable sampling device for individual well stream sampling;
A retrievable SCM for control and monitoring;
Retrievable chemical injection devices such as metering valves, etc.;
Instrumentation for condition monitoring;

The number of well slots on the PLIM (any PLIM mentioned in this document) may be tailored to the requirements of any field development in which the PLIM is to be used, including providing slots which are initially not in use but which are connected to XTs in a subsequent field development phase or phases. Thus the PLIMs concerned may be provided with anything from a single well slot, up to any number that may be necessary (beyond the two shown in FIGS. 7-13); provided that the handling equipment used for PLIM installation has the capacity for the size and weight of the resulting PLIM.

In the embodiments described above, the umbilical is installed by conventional methods and is connected to the PLIM via multi-bore hubs, with power, controls and chemical supplies distributed through/to the PLIM. The umbilical may also be piggy-backed to the flowline before connecting to the PLIM, as well as being connected to the PLIM prior to the PLIM being installed (dry-mate connection on installation vessel). The UTA provided in any of the embodiments described in this document may be duplicated and the two UTAs interconnected within the PLIM concerned, to allow for "daisy chaining" of umbilicals and the services which they supply.

The PLIM may be designed to cater for a single service system (production fluid, water injection, gas injection, chemical service, etc.) or any desired combination of these, with any specialized equipment that is required for such service(s) and is not limited to any one such service or all such services.

The invention claimed is:

1. A subsea manifold comprising: at least one hub fluidically connectable with a subsea christmas tree; a connection for at least one service line connected to a surface supply or control or monitoring facility; a first port constructed and arranged to be capable of connection to a first part of a pipeline; and a second port constructed and arranged to be capable of connection to a second part of the pipeline, wherein, once the first port is connected to the first part of the pipeline and the second port is connected to the second part of the pipeline, the subsea manifold becomes an inline manifold that is structurally integrated into the pipeline whereby at least a part of the manifold is not retrievable independently of the pipeline; the subsea manifold further comprising; one or more production fluid flow control or isolation valves; one or more connections for one or more electrical, optical or hydraulic lines used to operate the valve(s); and logic caps that allow reconfiguration of chemical and hydraulic supply paths.

2. The subsea manifold of claim 1, wherein the subsea manifold is integrated into the pipeline by welding or flanged connection.

3. The subsea manifold of claim 1, wherein the subsea manifold is constructed and arranged for structural integration between the first part of the pipeline and the second part of the pipeline.

4. The subsea manifold of claim 1, comprising a conduit having the first port and the second port at its ends to form a pair of structurally and fluidically interconnected ports by which the subsea manifold is structurally and fluidically integrated into the pipeline once connected to the first part and the second part of the pipeline.

5. The subsea manifold of claim 4, wherein the pair of ports are coaxially aligned.

6. The subsea manifold of claim 4, wherein at least part of the mechanical load imposed upon the subsea manifold by the pipeline is carried by a structure of the manifold which is not the conduit.

7. The subsea manifold of claim 1, provided with an attachment point for a lifting or tensioning chain or a lifting or tensioning cable.

8. The subsea manifold of claim 7, comprising a conduit having a first end fluidically connected to the pipeline and a second openable end closable by a valve.

9. The subsea manifold of claim 8 comprising a pig launcher or receiver connectable or connected to the second openable end of the conduit.

10. A subsea manifold according to claim 1, comprising an integrated foundation or mud mat.

11. The subsea manifold of claim 1, comprising one or more retrievable components.

12. The subsea manifold of claim 11, comprising a base module which remains permanently connected to the pipeline, and one or more retrievable modules, subassemblies or components releasably connectable to the base module.

13. The subsea manifold of claim 12, wherein the base module comprises a main pipe integrated into the pipeline and provided with an inboard hub; and a foundation attached to the main pipe or the inboard hub; the one or more retrievable modules subassemblies or components being connected to said inboard hub or corresponding inboard hubs.

14. The subsea manifold of claim 13, wherein the main pipe integrated into the pipeline is connected to a pair of said hubs and an isolating valve is provided in the pipe between the pair of said hubs; the retrievable module comprising a corresponding pair of hubs releasably connectable with the pair of said hubs to which the main pipe is connected.

15. The subsea manifold of claim 12, wherein the base module comprises a pair of pipe stubs structurally connected to respective parts of the pipeline and fixed to a structural frame of the base module; each pipe stub being provided with a hub connector releasably engageable with a corresponding hub connector on the retrievable component.

16. The subsea manifold of claim 1, wherein the at least one service line comprises an external signal line.

17. The subsea manifold of claim 16, wherein the connection interconnects one or more external signal lines with one or more sensors or instrumentation on or in the subsea manifold.

18. The subsea manifold of claim 17, wherein the sensors or instrumentation comprise one or more of: a pressure sensor, a sand or erosion detector, a viscosity sensor, a pH meter, a pig detector, a position sensor, a flow meter, a multiphase flowmeter.

19. The subsea manifold of claim 1, wherein the connection comprises one or more of an umbilical termination head and an umbilical termination assembly.

20. The subsea manifold of claim 1, wherein the connection interconnects with at least one further connection for an associated further service line.

21. The subsea manifold of claim 20, arranged to distribute the service provided via the service line and its connection, to other subsea equipment, via the further connection(s).

22. The subsea manifold of claim 20, wherein the at least one further connection comprises a subsea distribution unit.

23. The subsea manifold of claim 20, wherein the at least one further connection comprises a multi-bore hub connector.

24. The subsea manifold of claim 20, wherein the at least one further connection is connected to an associated multi-bore spool arranged to convey production fluid and/or one or more service fluids between the subsea manifold and a subsea tree.

25. The subsea manifold of claim 1, comprising a subsea control module.

26. The subsea manifold of claim 1, in which the service provided via the connection comprises:
   i. hydraulic power and/or electric power, the subsea manifold being arranged to distribute the hydraulic and/or electric power to other subsea equipment;
   ii. hydraulic, electrical or optical data signals, for control of equipment integral to or external to the subsea manifold or for monitoring the condition of such integral or external equipment, or for monitoring process or environmental conditions in such integral or external equipment; and/or
   iii. service fluids for use in a well to which the subsea manifold is connected or to be connected.

27. The subsea manifold of claim 1, comprising a plurality of such connections.

28. The subsea manifold of claim 27, in which the plurality of connections provide a plurality of different services.

29. The subsea manifold of claim 27, wherein a plurality of the connections provide the same service.

30. The subsea manifold of claim 1, comprising subsea processing equipment.

* * * * *